United States Patent [19]
Byrd et al.

[11] Patent Number: 6,049,269
[45] Date of Patent: Apr. 11, 2000

[54] WIDE AREA WIRELESS SYSTEM FOR ACCESS INTO VEHICLES AND FLEETS FOR CONTROL, SECURITY, MESSAGING, REPORTING AND TRACKING

[75] Inventors: Joseph E. Byrd; Kaspar A. Kasparian, both of Raleigh, N.C.

[73] Assignee: Telectronics, Inc., Raleigh, N.C.

[21] Appl. No.: 08/626,809

[22] Filed: Apr. 3, 1996

[51] Int. Cl.[7] .................................................. B60R 25/10
[52] U.S. Cl. ....................... 340/426; 340/425.5; 340/539; 307/10.2
[58] Field of Search .................................. 379/44, 57, 63; 364/424.045; 340/311.1, 426, 425.5, 825.44, 539; 367/10.2, 10.3

[56] References Cited

U.S. PATENT DOCUMENTS

| | | | |
|---|---|---|---|
| 4,754,255 | 6/1988 | Sanders | 340/426 |
| 5,479,157 | 12/1995 | Suman et al. | 340/825.31 |
| 5,588,038 | 12/1996 | Snyder | 379/57 |
| 5,606,307 | 2/1997 | Kuan | 340/426 |

*Primary Examiner*—Jeffery A. Hopsass
*Assistant Examiner*—Daryl C. Pope
*Attorney, Agent, or Firm*—Breneman & Georges

[57] ABSTRACT

A new add-on vehicular system is capable of responding to large area or nation-wide commands over paging networks, to remotely foil the unauthorized use or theft of a vehicle or a fleet automobile or a group of fleet vehicles, as well as to help the recovery of stolen vehicles. The preferred embodiment of the system comprises a paging receiver and decoder, a microcontroller with embedded programmable software and memory and a vehicular systems control interface. The system does not require central monitoring systems, or portable controls or vehicular user set controls or portable key chain controls or keypads or cellular phones or separation of vehicular transceivers from owner carried transceivers to activate the system. In a second embodiment, a two-way radio paging approach is employed in the system to expand its capabilities and to additionally provide remotely controlled transmission of data from vehicles, including data pertaining to the position coordinates of the vehicle.

57 Claims, 10 Drawing Sheets

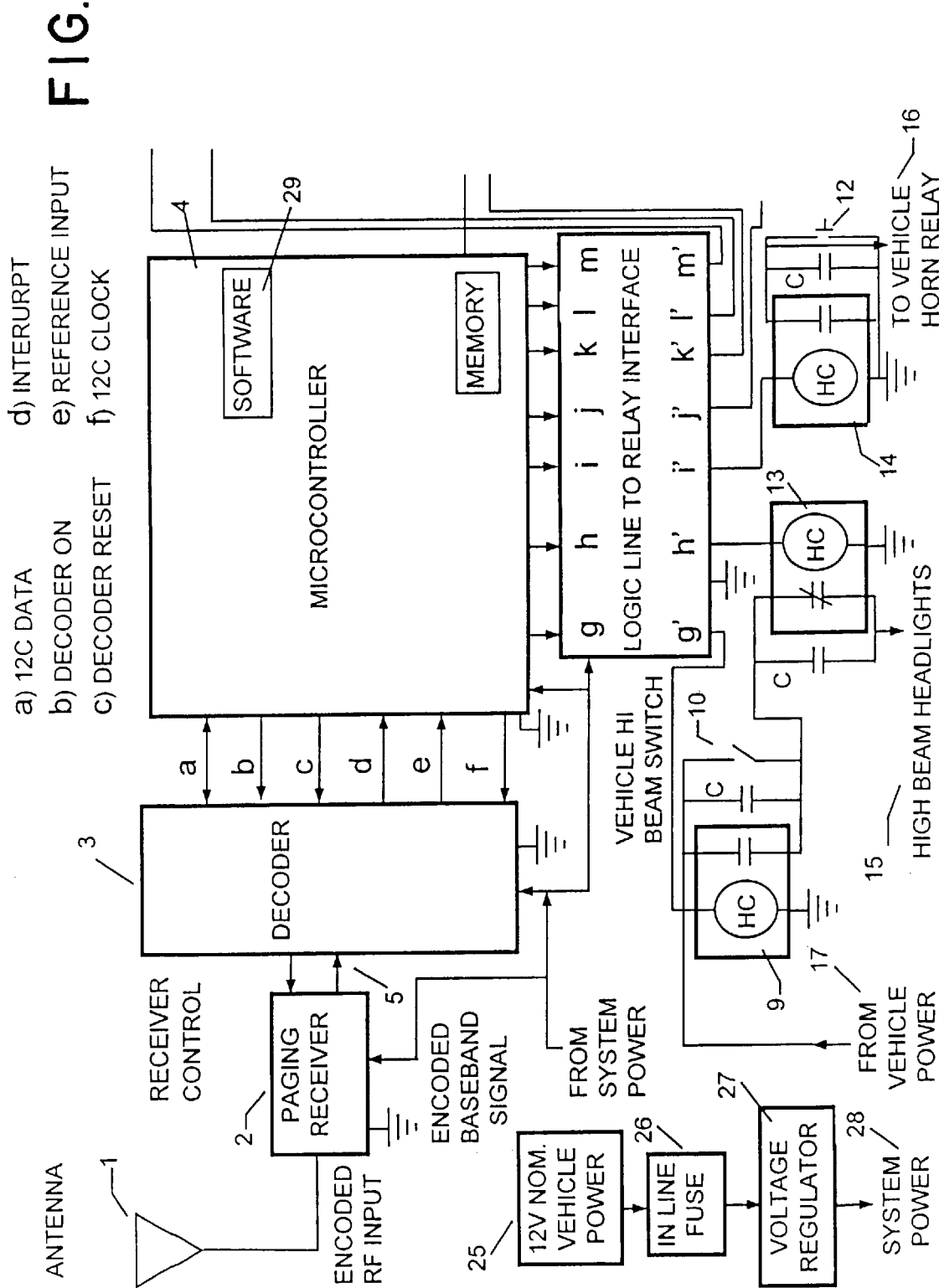

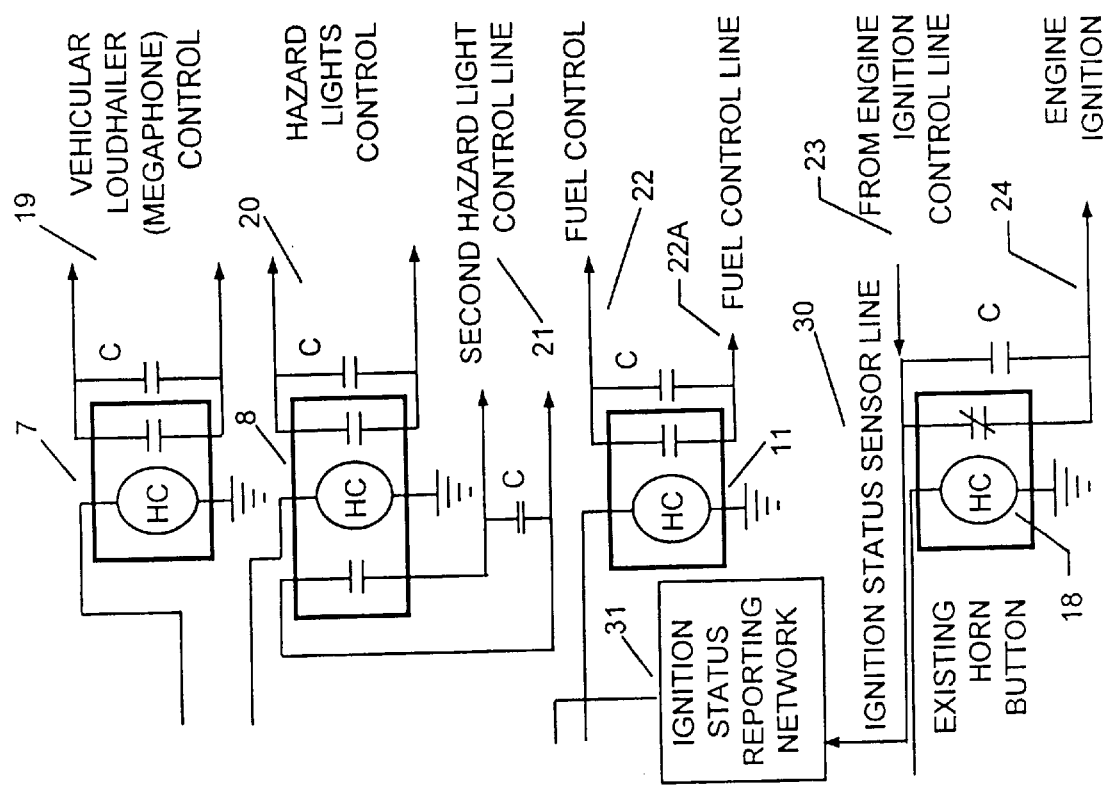

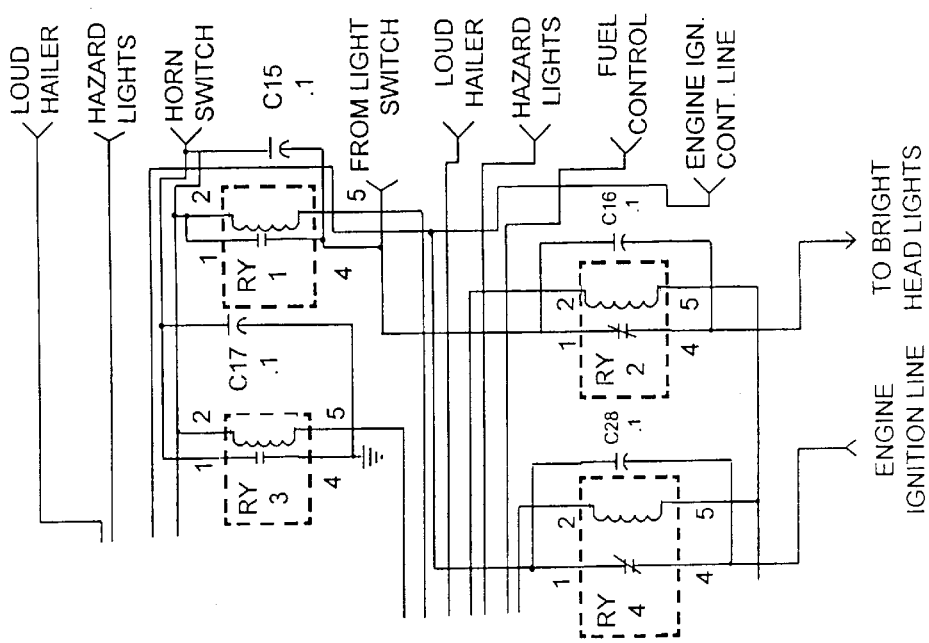

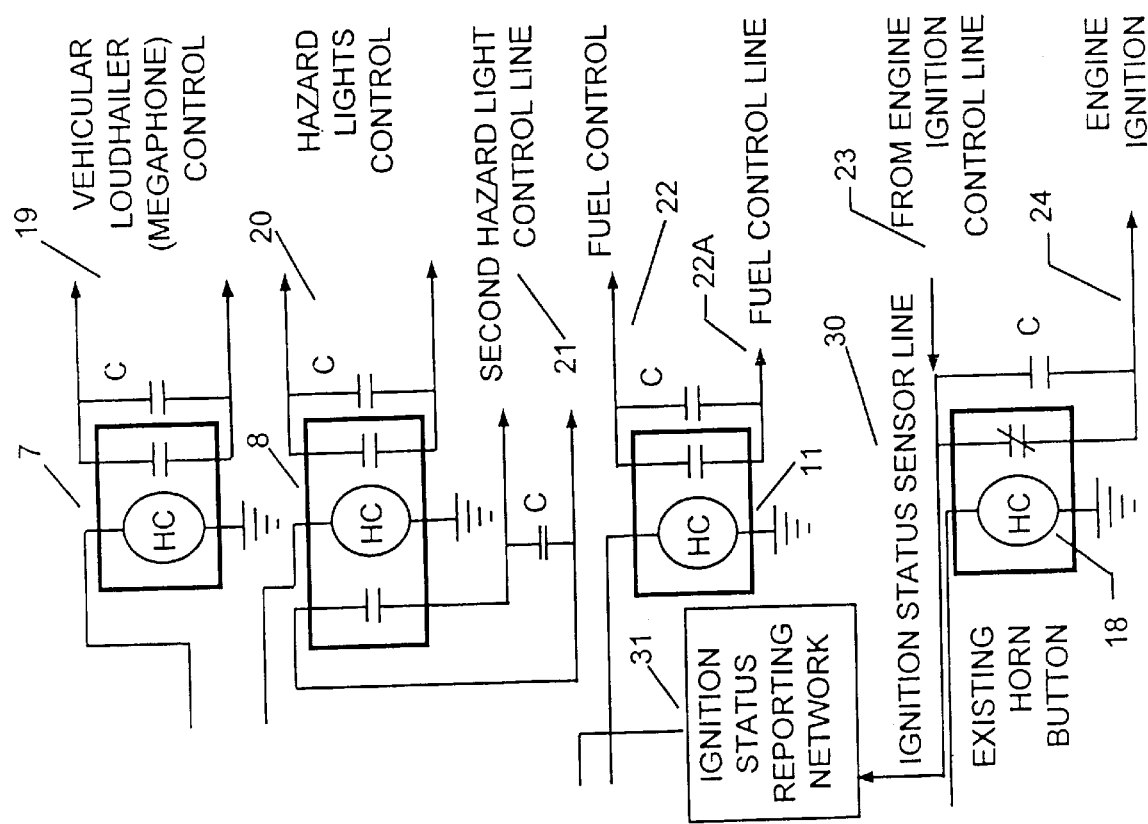

WIDE AREA WIRELESS SYSTEM FOR ACCESS INTO VEHICLES AND FLEETS FOR CONTROL, SECURITY, MESSAGING, REPORTING AND TRACKING

FIELD OF INVENTION

This invention is in the field of security. It pertains to fleet and individual vehicle security and, more specifically, a system for foiling of carjackings and car thefts over a large area. The preferred embodiment of the system of the invention employs a new add-on vehicular system with means of responding to large area or nation-wide commands over paging networks, to remotely stall or stop or deter the unauthorized use or theft of a vehicle or a fleet automobile or a group of fleet vehicles, as well as to help the recovery of stolen vehicles, without necessitating portable controls or vehicular user set controls or portable key chain controls or cellular phones or separation of vehicular transmitter and receiver systems from owner carried transmitter and receiver systems to activate the system. In a second embodiment, two-way paging is employed in the system of the invention to additionally provide remotely controlled transmission of data from the vehicles, including position coordinates.

BACKGROUND OF INVENTION

One of the most traumatic experiences of modem times is to be subjected to a carjacking after a fearsome encounter with a criminal, without any concrete hope of foiling the carjacker or recovering the vehicle. Everyday, thousands of vehicles are being stolen from fleets or individuals or hijacked without any quick resolutions being available. Since a vehicle is one of the easiest means of getaway, the stolen vehicle is typically utilized to quickly place a large distance between the scene of the crime, the victim and law enforcement agencies. This phenomenon has dramatically changed our lives as we no longer feel tranquil and free of fear when moving about in a vehicle, or when observing stop signs or traffic signals, or going towards our parked cars or enjoying a ride. Often when a friend or a loved one leaves with a car, there is a sinking feeling of anxiety for their safety. Furthermore, in most cases, when the recovery of the stolen vehicle is delayed beyond several hours, it is taken apart and its subsystems sold through various criminal networks. Prompt action is required to foil carjackers and recover the vehicles.

This type of crime is not unique to the United States, as exemplified during a recent trip to Moscow where a car was carjacked right in front of the hotel in plain daylight. Car thefts and carjackings are major issues in many developing nations. The loss of one's vehicle in a large city like Moscow is quite debilitating, especially where there is widespread crime and when the cost of a replacement car can be prohibitive. In most cases, all any victim can do, is to report such a crime to the police by telephone as soon as possible, hoping the vehicle can be recovered. Carrying portable security remote controls is of no value in the case of a carjacking. The criminal almost always frisks and robs the victims, often making them lie face down and searching them thoroughly.

Criminals are also stealing government and police vehicles, posing a greater hazard to citizens and public safety organizations. Car dealerships and garages suffer equally when unattended vehicles are stolen at night or on weekends. Other vulnerable fleets include rental cars, military and commercial trucks carrying cargo, distribution vehicles with cargo, vehicles transporting money or precious items, very expensive tractors and bulldozers, armored personnel carriers, tanks and vans used for moving.

A simple, effective vehicular security system that can be accessed over a wide area to foil fleet or individual vehicle carjackings and car thefts during getaways, that can also help locate the stolen vehicles, as well as deter the theft of unattended vehicles, is needed to stop the rampage of carjackings and car thefts plaguing society. The system of the invention specifically and effectively addresses and fills this need.

DESCRIPTION OF THE PRIOR ART

The present invention has not been found in prior art, nor does prior art suggest or teach anything resembling the method of this invention. There are various conventional and seemingly exotic vehicle security systems on the market falling into a number of well-known categories. However, there are no vehicular systems designed for fleet managers and vehicle owners to directly, over the phone—from anywhere in the world where there is telephone service, to foil carjackings and car thefts in progress, for one or more vehicle at a time, over wide geographical areas, using pager networks that are available in most parts of the world, without needing portable control transmitters or portable and mobile transceivers, with means to clearly point out stolen vehicles, plus means to prevent the use of the vehicles for getaways and additional means to also deter the theft of parked fleet vehicles and individual cars with a single phone call.

The following are the known types of vehicular security or anti-theft protection systems as compiled from pertinent sources, including "Installation News" a periodical that specializes in vehicle security products, recent shows related to vehicular security systems, previous patents and security product supply stores such as Radio Shack and Sears:

- Motion sensor based car security systems
- Entry code activated car security systems
- Key chain transmitter or other portable transmitter controlled car security systems
- Proximity detector car security systems
- Vehicular security systems that alert the owner by sending a transmitted signal
- Key controlled electrical security systems
- Mechanical security systems
- Cellular phone controlled security systems
- Data transmission based security system with centralized remote control
- Vehicular transceiver and portable transceiver system activated by their separation None of the above prior art car security systems is designed for foiling fleet, as well as individual carjackings and car thefts in progress by means of simple phone calls placed by the owner of the car or manger of the fleet, using wide area paging networks, without having to use portable remote controls or expensive cellular systems that can be ripped out or without relying on a control system managed by others from some other location. None of the prior art vehicular systems are designed for vehicle operators and fleet managers to arm and disarm both the carjacking related getaway foiler mode or unattended car protection mode, for one or more vehicles, from any telephone in the world.

Examining prior art systems in more detail, the motion sensor type car security systems employ motion sensors, such as pendulums, which upon movement of the car or its portions, close electrical contacts that produce alarms, such as the honking of the horn or activation of the lights. Some motion sensing systems, when triggered by motion, also open electrical contacts that prevent starting of the car. In addition to simple mechanical opening and closure of contacts, such systems can use digital circuitry with solid state control of various portions of the vehicle. Other versions of this type of security system also cause an alarm to be triggered when a door or window or other locked portion of the vehicle is opened. However, these types of systems are ineffective during carjackings, as most vehicles are carjacked while occupied or in the presence of the legitimate operator or with the keys of the car and the controls of the security system provided to the carjacker under duress and with the security system inactivated. Furthermore, these systems can not foil the progress of the carjacking after the thief drives away in the stolen vehicle nor can they provide control for fleets to provide instant securing of fleet vehicles whether attended or unattended.

Entry code activated systems employ a keypad that is in or on the vehicle, to activate or deactivate the security system of the vehicle, which when activated, produces various alarms and can also prevent starting of the car. With some versions, a short-range radio signaling employing a portable quasi-pager is provided to alert the vehicle's legitimate operator of the theft. However, these types of systems are ineffective during carjackings, as most vehicles are car-jacked while occupied or in the presence of the legitimate operator or with the keys of the car and code provided to the carjacker under duress and with the security system inactivated. Furthermore, these systems can not foil the progress of the carjacking after the thief drives away in the stolen vehicle nor can they provide control for fleets to provide instant securing of fleet vehicles whether attended or unattended.

Key chain transmitter or other portable transmitter controlled car security systems employ a low power transmitter, such as a UHF Band transmitter in the 350 MHz Band, to remotely arm and disarm the system over short distances. They also remotely activate various electrical systems of the car, such as the head lamps. The control range of key-chain control transmitters is quite limited. When the system is armed, opening doors, windows or other locked portions of the vehicle trigger an alarm and may also prevent starting of the car. However, these types of systems are ineffective during carjackings, as most vehicles are car-jacked while occupied or in the presence of the legitimate operator or with the keys of the car and the key-chain transmitter or other portable transmitter control of the security system provided to the carjacker under duress and with the security system inactivated. Furthermore, these systems can not foil the progress of the carjacking after the thief drives away in the stolen vehicle nor can they provide control for fleets to provide instant securing of fleet vehicles whether attended or unattended.

An example of the above portable transmitter controlled car security system is illustrated in U.S. Pat. No. 4,691,801 to Yale Mann and Pekka Sarssi in which a hand-held infrared transmitter is employed to control the parking brake of vehicles to prevent theft or carjacking. The shortcomings are evident. Only a short range is achieved. The infrared signal from the portable infrared transmitter requires direct line of sight with the vehicle's infrared receiver, or a consistent reflective path guiding the light beam into the infrared receiver. Furthermore, the infrared signal is prone to interference from other heat sources, such as heat from sun heated roads which can reach over 100° F. in many parts of the world, as well as heat from vehicle exhausts and other sources of heat. Additionally, the remote control can be seized by the carjacker as most carjackings include robberies and frisking of the victim. Such a system, unlike the system of the invention, cannot control the vehicle's incapacitation over large distances nor able to control multiple fleet vehicles at the same time. The system of U.S. Pat. No. 5,307,048 to David G. Sonders also uses a remote controller with limited range. The same shortcomings apply for such systems. The portable remote control would have limited range and cannot control a plurality of vehicles. Such a system lends itself to the carjacker taking the controller unit from the victim while frisking the legitimate owner during a carjacking involving robbery as in many cases. It is also an expensive approach, since both a portable transmitter is required, as well as a receiver. Given the low power outputs of portable transmitters, according to radio propagation laws, line of sight between the transmitter and receiver determines the actual range of the control when frequency bands such as VHF and UHF that are relatively immune to ambient vehicular and electrical noise interference are commonly chosen for this type of transmission and reception. With the antenna of the vehicle's security system antenna being at a height of maximum six feet and the height of the antenna of the transmitter held by the victim being around 6 feet, the range of the line of sight communication is seriously diminished with distance, with noise from computers, vehicle ignition systems, high voltage power lines soon competing with the weak signals involved after a short distance where there is no longer a line of sight.

Proximity detector car security systems rely on the principle of impedance changes induced in electronic circuitry, such as oscillators, by body proximity or touch. One type of impedance change is the change in capacitance produced by the proximity of a human body or by a human touch. Such proximity or touch triggers an alarm and activates or deactivates various parts of the car to prevent theft. This type of system often requires a key chain-transmitter to deactivate the system for the legitimate operator and to set the alarm on upon parking the vehicle. However, these types of systems are ineffective during carjackings, as most vehicles are carjacked while occupied or in the presence of the legitimate operator or with the keys of the car provided to the carjacker under duress and with the security system inactivated. Furthermore, these systems can not foil the progress of the carjacking after the thief drives away in the stolen vehicle nor can they provide control for fleets to provide instant securing of fleet vehicles whether attended or unattended.

Remote signaling vehicular security systems are typically optional portions of the: other types of prior art security systems. Some remote signaling systems, however, are stand-alone and provide a signal to the legitimate operator of the vehicle when a car theft is in progress. This type of system typically comprises a low power transmitter that is installed in the vehicle and which is activated when a sensor, such as a door switch, triggers an alarm during a car theft attempt. A matching receiver that is carried by the legitimate operator receives the signal signifying a car theft in progress. Other, vehicular portions of this type of car security system produce alarms and can also prevent starting of the car. This category of systems is illustrated in U.S. Pat. No. 4,904,983 to Steven Mitchell and comprises an alarm condition detector, an auto-dialing mechanism and a radio telephone conveying the alarm condition to an alarm receiving station which records the event. U.S. Pat. No. 4,665,379 to Glomski Arthur F. and Howell Jack D. describes a system which uses sound discrimination to sense an alarm condition and provide various types of alarm reporting for theft prevention. A pager is mentioned without much clarification as one means of reporting an alarm condition. However, this would not be a conventional pager but simply a remote receiver that would be triggered to alert the legitimate owner of the vehicle. However, this type of system is ineffective during thefts as it requires the owner to rush to the vehicle and, at best, if the vehicle is not already stolen, either wait for the police to arrive or confront a criminal who may be armed. Also, such systems are ineffective for securing fleets or individual carjackings as most vehicles are car-jacked while occupied or in the presence of the legitimate operator or with the keys of the car provided to the carjacker under duress and with the security system inactivated. Furthermore, these passive and expensive systems using both transmitters and receivers can not foil the progress of a theft or carjacking after the thief drives away in the stolen vehicle.

Key controlled electrical security systems comprise a security system that is armed and disarmed with a key similar to an ignition key that closes an electrical system and arms the security system or opens a circuit and deactivated the security system. Once the system is armed and a sensor triggered, the actions of the alarm are analogous to the other types discussed above and can involve preventing the starting of the car. Again, these types of systems are ineffective during carjackings, as most vehicles are carjacked while occupied or in the presence of the legitimate operator or with the keys of the car and the key control of the security system provided to the carjacker under duress and with the security system inactivated. Furthermore, these systems can not foil the progress of the carjacking after the thief drives away in the stolen vehicle nor can they provide control for fleets to provide instant securing of fleet vehicles whether attended or unattended.

There are many types of mechanical security systems that deter driving or steering of the vehicle by a car thief None of these types of mechanical security systems are effective during a carjacking, as most vehicles are car-jacked while occupied or in the presence of the legitimate operator or with the keys of the car provided to the carjacker under duress and with the security system inactivated. Furthermore, these systems can not foil the progress of a theft or carjacking after the thief drives away in the stolen vehicle:, nor can they be used to stall or stop a fleet vehicle that is stolen or a group of cars that need to be simultaneously secured.

Other schemes, such as a secret activation of an alarm by the legitimate operator before leaving the vehicle can prevent a carjacker from driving away but is not advisable as, in most cases, carjackings are carried out by armed criminals and the last thing one wants to do is to provoke them while in a life threatening situation. Furthermore, many carjackings occur when the legitimate owner is approaching the vehicle, such as in a parking area.

Cellular phone controlled security systems require cumbersome modifications of cellular phones of which there are many types. In such an impractical system, a cellular phone in a stolen or carjacked vehicle has to be called and commands given to control various parts of a vehicle. This appeared as a humorous sequence in a recent movie. U.S. Pat. No. 5,276,728 to Kenneth Pagliarolli and Dean Pagliarolli represent valiant attempts of utilizing a mobile telephone based control approach from fixed and portable transmitters using mobile telephone networks and cellular phones. However, such a system is expensive, since it requires the installation of a mobile telephone such as a cellular phone. It would require custom interfacing due to the many types of cellular phones in use. Furthermore, the carjacker can turn off the cellular phone since it is a known fact that the phone can be used to trace the criminal.

The above referenced U.S. Pat. No. 5,276,728 mentions in its abstract the use of a scanning receiver. This signifies the use of multiple frequencies being scanned. In addition said abstract cites the requirement of at least one additional frequency outside conventional mobile telephone frequency ranges. This immediately represents potential problems and a waste of the finite and scarce resource of frequencies available especially in larger cities with little availability of free frequencies. Potential problems can ensue from the requirement of the minimum one extra frequency outside the normal mobile telephone frequency range. Such a frequency may not be available or, even if available, may not fall within the multifrequency spread capability of the mobile transmitter receiver and also may fall outside the range of the mobile telephone's duplexer which is designed for the mobile telephone operating band only.

The scanning requirement in U.S. Pat. No. 5,276,728 can further cause the preamble or part of the code being transmitted during the emergency to be lost, because the receiver can be on another of the scanned channels at the moment the first code is received. The signaling scheme in U.S. Pat. No. 5,276,728 is not clear whereas the actual scheme that would be utilized has an important bearing on reliability, accuracy and speed of such a system, as well as compatibility with the mobile telephone. The disablement means of said patent is also moot and ineffective if ignition control for disabling is used. Sudden interruption of ignition can be disastrous to other motorists driving around the vehicle controlled and would not disable a diesel vehicle that relies on compression to set off the explosion of the fuel-air mixture inside its cylinders and not on ignition. The cellular phone can also be torn out of its mounting bracket or have its exposed wiring in the passenger compartment cut or disconnected. Cellular coverage is limited or unavailable in many parts of the world and is further hampered by the lack of uniformity in the designation of universal frequencies and signaling schemes for mobile telephone service. In Europe, adjacent countries have to use different frequencies not to have mutual interference. Among further drawbacks, many current cellular users prefer portable phones thus not being able to prevent the theft of the unattended vehicle whenever the portable phone is with the legitimate operator or whenever the portable phone has to be surrendered to the criminal during a carjacking.

In a further pursuit of employing cellular telephones for vehicular security systems, U.S. Pat. No. 5,)81,667 to Drori Ze'ev and Woskow Robert M. discuss providing multiple types of interfacing for different types of mobile cellular phones through software libraries and then utilizing the radio link established to provide various telemetry and alarm functions. In one variation, the alarm condition is reported by the vehicular cellular telephone dialing a remotely located pager through preprogrammed coding presumably to report an alarm situation. This is quite different from the system of the invention where a paging receiver is used in the vehicle and not for a passive reporting role but for effecting control over the vehicle though a unique combination of the to same elements of the system of the invention. U.S. Pat. No. 5,081,667 suffers from the principal problems as the aforementioned U.S. Pat. No. 5,276,728 to Kenneth Pagliaroli and Dean Pagliaroli. It is not economical to have to purchase a cellular telephone, adapt it with special interfacing and, during carjackings or theft, risk the mobile telephone being torn out or incapacitated through cutting of wiring attached to the cellular phone. As all criminals have realized through cases such as the murder and carjacking of Michael Jordan's father, the mobile telephone can be used to trace them. Furthermore, simply providing a software library to cover various types of cellular phones is not sufficient to impart special capabilities to mass manufactured or even custom manufactured cellular phones. There would have to be hardware additions and modifications necessary to accommodate the library of software, and for the software to interact with the microcontroller and radio frequency circuits of the cellular telephone and its memory banks which are nowadays miniaturized and densely packed through multilayer surface mounted circuitry. Cellular phones are intended for cellular use only and In general would be difficult to transform. Additionally such modifications will certainly interfere with the original manufacturer's design and may invoke legal disputes on proprietorship of designs and revocation of warranties. To the long list of shortcomings of such an approach is added the fact that miniature hand-held portable cellular phones are coming into widespread use since they provide safety access and communications beyond a vehicular cellular telephone. Limitations on the above cited system of U.S. Pat. No. 5,081,667 include an inability to control fleets of vehicles and coping with the myriad of mobile telephone systems in use around the world each with its signaling scheme and regulations. Data transmission based vehicular security system with centralized remote control are not self sufficient or stand-alone systems and depend on central systems wherein lie most of the intelligence and protocols of the system. Such systems require costly central supervisory facilities which would have to be duplicated or connected to different regions and installed in various parts of the country and parts of the world. The data format and frequency bands used are under control of PTT (Post Telephone and Telegraph) authorities in almost all parts of the world, which regulate data transmission protocols and allocation of frequency bands.

Finally there are the vehicular transceiver plus portable transceiver systems that are activated by the separation of the a transceiver in the vehicle and another "palm-sized" transceiver that is carried by the vehicle operator. This is indeed a very expensive, approach with serious limitations. In addition to the transmitter and receiver in the vehicle forming part of the system, a portable transmitter-receiver is required and must be carried by the legitimate operator at all times. Among other limitations of such systems is the requirement of continuous and heavy battery usage for the portable transmitter-receiver, very limited range—certainly not operable over a wide area, inability to secure fleets, complications during valet parking when the vehicle has to be separated from the legitimate operator, a requirement for multiple portable transceivers when more that one person, such as a husband and wife, need to use the transmitter, complications when multiple users of the vehicle each carrying a portable transceiver are separated and ineffectiveness during carjackings, as most of the time, the victim is frisked and robbed and thus would have to surrender the hand-held transmitter receiver.

None of the above discussed prior art systems provide the full capabilities of the system of the invention and have inherent shortcomings in meeting the objects of the invention.

SUMMARY OF THE INVENTION

The system of the invention is primarily intended for vehicular applications, although it can be employed for non-vehicular or fixed applications to effect essentially all types of remote control functions desired. Accordingly, the following disclosure primarily relates to vehicular applications of the invention.

The system of the invention is referred to by the inventors as "Vindicator", said term being intended for use interchangeably hereinafter with the term "system of the invention". Vindicator is a new add-on vehicular system for vehicles that are already in use and is also intended for factory installation in new vehicles. The invention provides a means of responding to wide area or nation-wide commands over paging networks that are available in most parts of the world, without necessitating portable transmitter control or hand-held operator controls in the vehicle. The system of the invention is capable of being remotely activated from anywhere in the world that has telephone service. Depending on the mode of remote activation chosen, the system of the invention will prevent the theft of an unattended vehicle or theft of a fleet automobile or theft of a group of fleet vehicles, as well as gradually incapacitate such vehicles during a getaway after theft, including during carjackings. Additionally, the system of the invention is designed to help the recovery of stolen vehicles.

It is thus an object of the invention to provide a means of foiling fleet vehicle car thefts, whether involving one fleet vehicle or multiple fleet vehicles, or an individual vehicle and whether the vehicles are unattended or upon the occurrence of a carjacking.

Another object of the invention is to provide a means of reaching the vehicular system of the invention by wireless signals over city wide areas covered by paging networks and initiating the foiling of fleet or individual car thefts and carjacking from anywhere in the city where the theft or carjacking occurs.

It is an additional object of the invention to provide further means of reaching the vehicular system of the invention over wide area or statewide paging networks and remotely initiating the foiling of fleet or individual car thefts and carjacking on a statewide basis.

It is a further object of the invention to provide further means of reaching the vehicular system of the invention over a nationwide paging network and remotely initiating the foiling of fleet or individual car thefts and carjacking on a nationwide basis.

It is another object of the invention to provide the legitimate owner of the fleet or individual vehicles to reach the vehicular system of the invention and initiate the foiling of fleet or individual car thefts and carjacking, within the full extent of the geographical coverage of the paging network the vehicular system is registered in, from anywhere in the world where there is telephone service.

It is a further object of the invention to foil carjackings in such a manner as to draw attention to each stolen vehicle to help its recovery.

It is another object of the invention in one of its embodiments to foil carjackings by providing means for locating the vehicle through the transmission of pertinent data from various systems in a vehicle, including data on exact location coordinates from a vehicular global positioning system working in conjunction with the system of the invention.

Another object of the invention is to deter the criminals from using the stolen vehicle for a getaway, through a gradual, safe and partial incapacitation of the vehicle while it is being driven in public areas, so as not to pose a danger to other motorists or the public, yet prevent the use of the stolen vehicle for escaping.

It is an objective of the invention through a remote slowing down and incapacitation of a stolen vehicle to obviate high speed chases by police, often endangering the public and the lives of officers, to catch a speeding car thief.

It is yet another object of the invention to eliminate the need for operator controls in the vehicle to activate the foiling system or the use of portable remote controls. This is intended to make the system of the invention inconspicuous, to deter the potential coercion of the legitimate vehicle operator into yielding the remote controls used in prior art systems to the carjacker or being forced under carjacking duress to deactivate the vehicular security system.

Another object of the invention is to greatly reduce the expense of a system for foiling fleet or individual car thefts and carjackings through the simple, yet very effective system of the invention essentially comprising of 1) an inexpensive new generation mass produced paging receiver chip with a decoder (without the usual batteries, display and other frills of a conventional complete pager), 2) a commonly available microcontroller with programmable software instructions and 3) a vehicular interface. The software instructions, once developed and adjusted to the specific use, do not represent any tangible or significant future manufacturing costs, requiring only a loading or programming adjustment procedure that is essentially common to all microcontrollers. Prior art systems cannot provide the capabilities of the system of the invention. They also employ a plurality of expensive elements, including special limited range transmitter and receiver units, dual transceivers, modified mobile cellular telephones, software libraries, hand-held remote controls, expensive central systems, expensive use of multiple radio frequency channels and expensive custom radio networks to provide communications.

It is a further object of the invention to effect control over vehicular systems for the purpose of foiling fleet or individual car thefts and carjackings without requiring pervasive modifications of the car vehicle manufacturer's systems. The approach utilized in the system of the invention simplifies installation and does not interfere with the delicate electronic computer based systems of vehicles.

A further object of the invention is the use of a versatile, open and programmable software infrastructure in the system of the invention so as to allow programmable customization without hardware changes. Such customization capability includes expansion of the basic operating modes of the system of the invention, expansion of the number of vehicular controls it effects, expansion of the number of vehicles a fleet consists of, adjustment of the number of digits required to enter over the phone to take over control of portions of the vehicle, adjustment of the timing of various control and alerting sequences, customization for external data transmission in the two-way embodiment of the invention, customization for fleet operation or individual use, adjustment for grouped control of vehicles, adjustment of the degree to which the vehicle is incapacitated and over how much time and adjustment of the initializing protocols that enter the vehicular system into a paging network.

BRIEF DESCRIPTION OF THE DRAWINGS

FIG. 2 is a detailed system connection and flow diagram of the preferred embodiment of the invention represented by FIG. 1, disclosing the system connections and signal flow details of the system blocks, details of the interaction between the system elements and details of each sub-element of the vehicular interface system.

FIG. 5 discloses the connections and signal flow details of the system elements, details of the interaction between the system elements and also details of each sub-element of the vehicular control systems interface.

DETAILED DESCRIPTION OF THE DRAWINGS

Figure 1:
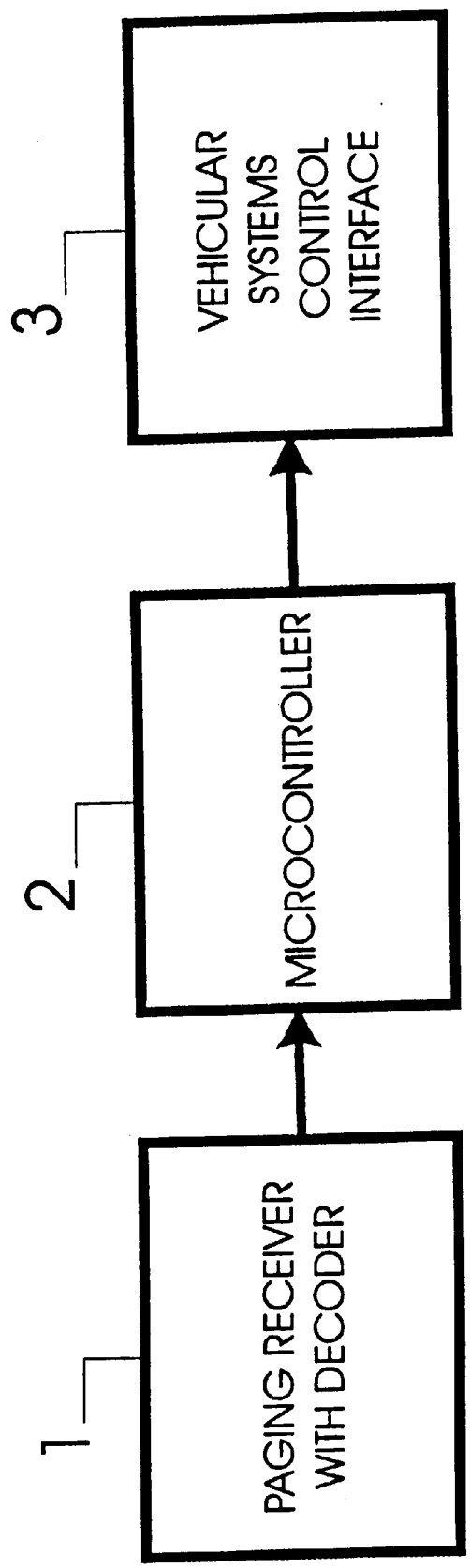
FIG. 1 is a block diagram of the preferred embodiment of the system of the invention comprising a paging receiver and decoder unit 1, a microcontroller 2 and a vehicular interface 3.

FIG. 1 is a block diagram of the preferred, currently lower cost embodiment of the system of the invention. It comprises a paging receiver and decoder unit 1, a microcontroller 2, and a vehicular interface 3. This system is designed to prevent the theft of unattended fleet vehicles or individual vehicles and to aid in the recovery of fleet vehicles or an individual stolen vehicle that is being driven away after a theft or carjacking. After the vehicle is stolen, the owner, using the public telephone system, calls an assigned telephone number and enters the customer defined identification number plus a code to specify the operating mode desired. In the case of a criminal escaping with a stolen vehicle, the particular code used will enable the getaway foiling mode. The call made will result in a paging signal being sent over an existing paging network and received and decoded by the paging receiver and decoder unit 1 of the system of the invention in the vehicle. The identification dialed by phone plus the code for the desired operating mode entered by phone is decoded by the receiver and decoder 1 and conveyed to the microcontroller 2 interconnected with the paging receiver and decoder unit 1. This will result in microcontroller 2 causing the vehicular interface 3 to activate a series of distinct alarms, followed by a gradual loss of the fuel flow to the engine of the vehicle, culminating in the fuel system being gradually and effectively disabled so as to prevent the criminal using the vehicle for a getaway, without posing a hazard to other motorists. When the engine is incapacitated after the activation of this getaway foiling mode, the vehicle will not start due to the disablement of the ignition system as programmed into the system of the invention.

Pursuant to the main alarm and incapacitation event, the vehicle will continue to periodically sound the horn and flash the lights in a distinctive pattern. This series of actions serves to foil the thief and to assist in the prompt recovery of the vehicle. The car may be returned to normal operating service by simply calling the assigned paging telephone number and entering the identification number of the legitimate owner of the vehicle plus the alarm reset code.

FIG. 2 is a detailed system connection and flow diagram of the preferred embodiment of the invention represented by FIG. 1, disclosing the connections and signal flow details of the system blocks, details of the interaction between the system elements and details of each sub-element of the vehicular interface system. Antenna 1 is normally an integral part of paging receiver 2. Decoder 3 can be an on-board decoder of the paging receiver as in most commercial pagers or a separate unit. Antenna 1, paging receiver 2 and decoder 3 are shown separately in this figure to disclose the signal flow and interaction of the elements comprising the pager and decoder unit which are shown as a single block in FIG. 1. Such description is intended to enable one skilled in the art to utilize elements 1, 2 and 3 separately if so desired.

The paging receiver 2 receives the paging signal. Paging receiver 2 and decoder 3 are configured for receiving and decoding a standard FSK (Frequency Shift Keyed) signal, although they can also be configured for other types of paging signaling that may be employed. The FSK signal from antenna 1 and paging receiver 2 provides the encoded binary baseband signal 5 to the paging decoder 3. This implementation of the system of the invention employs a direct conversion receiver designed to receive data on one channel. Multichannel receivers can be substituted in the same configuration as single channel paging receiver 2 if desired. The data rate, modulation frequency deviation, and transmitter-receiver frequency offset is such that the signal power lies within +/−10 kHz of the Local Oscillator (LO) frequency of receiver 2. In the direct conversion receiver 2, the LO frequency is ideally equal to the transmitted carrier frequency. When the two are mixed, the modulating signal is the result. The encoded baseband signal 5 is the modulating signal. Decoder 3 receives the encoded baseband signal 5 from receiver 2, decodes it, checks and corrects errors, determines that the programmed Receiver Identification Code (RIC) is correct, stores the received data in the built-in Random Access Memory (RAM) buffer of the decoder 3, and communicates the data to the microcontroller 4. Decoder 3 minimizes power consumption by turning off the receiver 2 periodically via the Receiver Control line that is labeled Receiver Control in the flow line portion of FIG. 2 and located between decoder 3 and receiver 2. Decoder 3 also provides "real time" timing for the system as needed and a built-in Electrically Erasable Programmable Read Only Memory (EEPROM) for storage of critical data in the event of power loss. In this embodiment of the invention, the encoded baseband signal 5 conforms to the internationally recognized CCIR Radio Paging Code #1 commonly referred to as POCSAG (Post Office Code Standardization Advisory Group) encoding. Any other accepted standard could be substituted in the same configuration as FIG. 2 by simply substituting the receiver 2 and decoder 3 while maintaining the same scheme and other elements of FIG. 2.

The heart and uniqueness of the system, often described as the "personality" of the system of the invention, is defined by microcontroller 4 and its embedded, modular, open and accessible programmable software instructions 29. The programmable software 29 used in the system of the invention, also referred to as source code, which is converted to object code, imparts instructions to microcontroller 4 and governs the system of the invention according to the directives it contains. The programmable software 29 infrastructure used for the system of the invention is attached with comments as further disclosure to allow anyone skilled in the art to recreate the system of the invention without undue effort and customize it as desired.

Microcontroller 4 communicates with decoder 3 to acquire the decoded POCSAG data and compares it with what it is programmed to expect. If the data communicated to microcontroller 4 is correct per embedded software 29 instructions in the microcontroller 4, it executes the corresponding programmed action. Actions that require interaction with the vehicle subsystems are communicated to the logic line to relay interface unit 6 which performs the role of an interface for the vehicular systems control devices shown as relays 7, 8, 9, 11, 13, 14 and 18 in FIG. 2. After weighing the pros and cons of using other types of vehicular systems control devices, in this preferred embodiment, heavy duty vehicular relays are employed for controlling the vehicular systems. Other devices, such as solid state vehicular systems devices could be substituted in lieu of the electromechanical relays 7, 8, 9, 11, 13, 14 and 18 within the same scheme. All holding coils (energizing electromagnetic coils) for relays 7, 8, 9, 11, 13, 14 and 18 are labeled HC in FIG. 2. All contacts of the relays have a parallel bypass capacitor C to smooth the electrical make and break of the contacts and related current flow and interruption. The logic to relay interface 6 includes internal means of providing further smoothing of the make and break function of the contacts of relays 7, 8, 9, 11, 13, 14 and 18, minimizing related sparking that may cause pitting of the contacts over a period of time.

Relay 7 is reserved for activating any ready made vehicular installed loudhailer unit (also known as a megaphone) with a built-in verbal announcement, providing direct warning to the public during the getaway foiling activation of the system of the invention, that the vehicle is stolen and police need to be notified. Relay 7 is a single pole single throw device (SPST) with normally open contacts. Relay 8 is a double pole single throw device (DPST) with normally open contacts, although it can also be a SPST relay if so desired. One set of the contacts of relay 8 as shown, controls the hazard lights of the vehicle in which the system of the invention is installed. In special cases, such as with the 1995 Oldsmobile Aurora, there may be two hazard light control lines or it may be desirable to program the software to provide a different pattern for each hazard line or use an extra set of contacts to turn on the interior lights or activate another vehicular device. In such cases, the second set of contacts of relay 8 can be used to control the second control line of the hazard lights or another vehicular device.

Relays 7 and 8 are both activated with the start of the getaway theft foiling programmed sequence during which they maintain a steady closure of their contacts. In FIG. 2, the connections to the hazard lights are made through control lines 20 of relay 8 and connections to secondary hazard lights or to another vehicular device are made through control lines 21. Control lines 19 from relay 7 are used to operate a vehicular loudhailer or similar device as is desired.

Relay 11 controls the operation of the fuel supply system, specifically the fuel pump control line or electric supply line to the fuel injector banks of the vehicle. In its deenergized state, its contacts are closed and the normal electrical control line to the fuel supply system of the vehicle is not interrupted. When energized it interrupts the normal operation of the fuel supply of the vehicle at points 22 and 22A per programmed software instructions of microcontroller 4 until the stolen vehicle is incapacitated and cannot be used for a getaway.

Ignition status sensor line 30 provides information to microcontroller 4 as to whether the ignition is on or off. Relay 18 controls the ignition line of the vehicle. In the de-energized state of relay 18, the ignition control line of the vehicle is not interrupted because relay 18 has normally closed contacts. However, during a car theft getaway situation when the foiling mode of the Vindicator is activated, relay 18 is instructed by microcontroller 4, to open its contacts and interrupt the ignition line to prevent the vehicle from starting once the fuel starvation has incapacitated the engine and ignition is turned off. Turning off the ignition, to stop all the distressing events in the car after the system of the invention is activated in the getaway foiling mode, would be a normal reaction for the thief. Once the vehicle is incapacitated to the point of a slow speed, any attempt to turn on the ignition will activate relay 18 and interrupt the ignition line, preventing the restart of the engine. Software 29 is currently configured to also effect an interruption of the ignition system once the vehicle is slowed down to a very low "crawling" speed. Any attempt to turn the ignition on will be sensed through the ignition sensing line 30 and ignition status reporting network 31, causing microcontroller 4 to command relay 18 to open its contacts and interrupt the ignition. This provides safety from the standpoint of avoiding a car engine remaining in a running state, even when moving at a very low speed. This ignition interrupting state continues until a reset mode is initiated by the legitimate owner of the vehicle to deactivate relay 18 and thus close its contacts when ignition is required to restore power to the ignition system of the vehicle. The connections to effect an interruption of the ignition are made at points 23 and 24. In a situation when the vehicle is unattended, the legitimate owner can access the vehicular system of the invention by calling a designated pager number, then enter the private user identification code, followed by dialing a specific code for invoking the unattended protection mode of the vehicle. In this case, any attempt to turn the ignition on will be sensed through the ignition sensing line 30 and ignition status reporting network 31, causing microcontroller 4 to command relay 18 to open its contacts and also start a cycle of enabling relays 7, 8, 9, 11, 13 and 14 to respectively activate the loudhailer if one is installed, the hazard lights, the headlights, fuel control shutdown and the horn. This occurs every time an attempt is made to turn on the ignition or to "hot wire" the vehicle in an attempt to steal and drive it away. This ignition interrupting state continues until a reset mode is initiated by the legitimate owner of the vehicle to deactivate relay 18 and thus close its contacts. The reset mode also deactivates all other relays.

The system of the invention, through minor changes in its programmed software 29 instructions, can be made to react differently or with different timing sequences or invoke other modes of shut down if so required, without necessitating hardware changes. As an example, the instruction to disable the ignition when the vehicle is incapacitated to a very slow speed by lack of fuel supply, can be changed by removing or adjusting the related programmed instructions. However, from a safety standpoint, the preferred embodiment of the invention draws attention to the stolen vehicle and effects a gradual shut down of the fuel supply and the ignition finally, thus effectively preventing any use of the vehicle by the criminal for a getaway.

Relay 14 controls the electrical lines that activate the horns of the vehicle in which the system of the invention is installed. When relay 14 is energized per instructions of the microcontroller 4, its contacts bypass the normally open contacts that control the horn and cause the horns to sound. This allows the energizing of the horn in a specific programmed pattern during a theft and attempted getaway situation. In the software 29 program disclosed for the preferred embodiment of the invention, an SOS (three short on/off commands followed by three longer on and off commands, followed by three on/off commands analogous to a "dit dit dit—dah dah dah—dit dit dit" morse signal) pattern for the horn is programmed and thus the horns produce an SOS pattern to draw public attention and discourage the criminal. SOS is a universally recognized sign of distress. Other patterns of horn activation can be easily implemented without hardware changes by modifying the accessible modular software 29 program statements attached in the program portion pertaining to the horn.

Relay 9 and relay 13 are used to control the high beam lights of the vehicle during the getaway foiling mode activation of the system of the invention. In their de-energized mode, relay 9 and relay 13 allow normal operation of the high beam of the vehicle. However, during the getaway foiling mode activation of the system of the invention, relay 9 bypasses the vehicle high beam switch system 10 of the lights and the normally closed contacts of relay 13 are opened and closed according to the pattern programmed. Such pattern is an SOS pattern command in the preferred embodiment of the invention.

When the microcontroller 4 is inactive, it is programmed to shut itself down to minimize power consumption and possible Radio Frequency Interference (RFI).

The 12 Volt nominal supply voltage 25 of the vehicle is connected to the vehicular system of the invention through power line wire 26 which includes an inline fuse and is connected to voltage regulator 27 and. Voltage regulator 27 provides the system power of 3.3 Volts for the vehicular system of the invention, specifically to paging receiver 2, decoder 3 and microcontroller 4. Logic line to relay interface unit 6 in FIG. 2 is connected to the fused vehicular nominal 12 Volt DC power 25 and provides control voltage to the holding coils of relays 7, 8, 9, 11, 13, 14 and 18.

The attached embedded, modular accessible programmable software approach for the Vindicator vehicular system of the invention, shown as software 29 in FIG. 2, is designed to provide a wide latitude of customization without necessitating hardware changes.

Software 29, among other capabilities, provides security to assure that:

An activity is not accidentally triggered by a random communication.

Once triggered, the system of the invention cannot be disabled by anyone that does not have the legitimate owner's personal identification number The disclosed embedded open, accessible and modular programmable software 29 further provides the following features and means:

Properly formatted communication with decoder 3 and its internal subsystems (Random Access Memory, EEPROM, and Timers)

Microcontroller 4 remains in a dormant or inactive state to minimize power consumption and radio frequency interference (RFI) until decoder 3 indicates that a communication for the specific Vindicator vehicular system concerned has been received or a control function must be performed. The vehicular system of the invention, therefore, uses a low amount of power when during an inactive standby state.

Initial factory setup for the specific desired configuration and testing

Entry of a specific user personal identification number upon installation in a vehicle Visual and audible verification to the customer of the receipt of a valid or invalid personal identification number In the case of an invalid personal identification number entry during the initial setup following installation of Vindicator in a vehicle, the system resets and awaits a new initial personal identification number entry Determination of a received identification or data error and rejection of an erroneous communication Determination of the required action to be taken upon entry of the desired foiling mode. Seven standard modes can be provided by programmable software 29 which allows expansion to 99 modes through program adjustments. The seven modes and their respective codes shown as digits following the word Mode, are as follows:

Mode 0—Factory Setup Mode, allowing factory setup and testing of the Vindicator. This mode is not available to non-factory users.

Mode 1—Getaway Foiling Mode, to enable the getaway foiling mode. In this mode, the high beam is flashed in a programmed pattern, horns sound in a programmed pattern, a vehicular loudhailer (if one is installed) is activated and will provide verbal loud messages to the public, the fuel supply to the vehicle is progressively reduced and at minimum programmed fuel supply state, ignition is finally disabled and restarting ignition is then disabled.

Mode 2—Reset Mode, to reset and deactivate the Vindicator after enabling a protective mode Mode 3—Unattended Protective Mode, to enable the unattended protective mode. In this mode, ignition is disabled by the ignition sensing circuit and by the ignition control relay as already described, every time an attempt is made to turn it on. In addition, all the other relays are activated providing a disabling of the fuel supply and drawing attention to the vehicle as in Mode 1. For safety reasons, Mode 3 can be activated only if the ignition is off already, as in the case of a parked vehicle This prevents inadvertent disabling of the ignition while the vehicle is being driven at traffic speeds. Mode 3 cannot be activated during Mode 1.

Mode 5—Initialization Mode, to enable re-initialization and entry of a new identification code Mode 6—Data Transmission Mode, to optionally enable transmission of data from vehicular sources external to the system of the invention. Such data is connected to the external data input port 32 described under FIG. 4 pertaining the second embodiment of the invention wherein a transceiver (two-way pager) is employed over a two-way paging network in lieu of a receiving pager operating over a one way paging network. The open and accessible software 29 can accommodate program adjustments to adapt the application of this mode to the transmission of mobile data, GPS (Global Positioning System) information to indicate the exact coordinates of the vehicle and other desired information.

Mode 7—Reset Data Transmission Mode, to turn off the optional transmission of data from external data sources in the vehicle. This mode too pertains to the second embodiment of the invention in which a two-way pager is utilized over a two-way paging network.

User set modes can be activated by dialing one of the Mode digits, but only after entry of a valid identification code corresponding to the identification code which is programmed during the initialization of the vehicular system of the invention. Modular and accessible programmable software 29 can be adjusted to add further logical modes within the infrastructure of the hardware and the basic architecture of software 29.

Implementation of the required action per instructions of the programmable software 29 program in the preferred embodiment of the system (which can be customized by program adjustments) is as described below:

1. Activation of the alarm sequence as follows:

Hazard lights on.

Then horn and bright lights flash SOS seven times or as programmed

Then horn and bright lights continue flashing SOS, while the fuel flow from the fuel pump is slowly reduced to near zero. With minor modifications of the programmable statements of software 29, after an initial progressive shut down, Vindicator can completely shut down the fuel supply of the vehicle and also open the ignition line.

During a getaway foiling mode, fuel supply to the vehicle engine is reduced by the system of the invention by control of the total time the fuel pump or fuel injectors is energized as opposed to long off tires during the later stages of progressive fuel reduction. This avoids surging of the vehicle as opposed to just losing power.

Then the alarm shifts to a shutdown state designed to save vehicular battery power but at the same time to attract attention. The horn will sound and the bright lights will flash SOS at regular intervals.

2. Remote reset of the vehicular system of the invention to a non-alarm state by calling the vehicular system of the invention from anywhere in the world with phones, entering a personal identification number and a reset mode code number.

Maintains the state of the system at the time power is lost and restores the vehicle to that state when power is restored.

Takes control of the high-beam lights so that the thief cannot turn the high beam lights on and off during a getaway foiling condition The customer identification number is set in software 29 at 9 digits lone plus 1 digit for the action mode desired. This number of digits was chosen because it is the length of the Social Security Number which most people remember. At the same time. The 9 digit identification code is long enough to provide excellent security against accidental or fraudulent activation.

The initialization process is carried out after installing Vindicator in a vehicle. First, the assigned pager number is called by telephone, causing a beep on the phone. Thereupon, the proprietary user identification number is entered. When the vehicular Vindicator system of the invention receives the call resulting from the paging, the vehicle lights produce three short flashes and the horn produces three short honks. To finalize initialization, the pager is called a second time and at the sound of the phone beep, the proprietary identification number is reentered. If the Vindicator receives the same number as it received the first time, it will sound three beeps and three flashes. If the second number received is different than the first number received, the Vindicator will cause an SOS pattern light flashing and SOS horn signal before resetting initialization and return to the very first initializing step. For future change of the proprietary identification number, the assigned pager number is entered, followed by the existing valid identification number, followed by the digit 5 for Mode 5 (Reinitialization).

The standard nine digit code can be used for fleet control or vehicle group control by assigning common nine digit identification numbers or partially common numbers with sequenced last position digits for designating specific fleet vehicles. This is easily accomplished during the above described initialization process. However, the openly accessible programmable modular software 29 is designed to be custom configured for fleet control without requiring hardware changes. As an example, an optional scheme can be programmed requiring the entry of additional four digits, after entering a nine digit identification code. The extra four digits can be specifically implemented for fleet use, allowing the security control of up to 9,999 fleet vehicles in groups or individually. Such applications of the system of the invention would allow shutting down a whole fleet, such as at car dealerships during nights and weekends, or a fleet of rental vehicles in the parking lot.

In fleet security control applications utilizing the above example of a thirteen digit identification code, the unattended vehicle theft foiling code would be entered after entry of the thirteen digits for preventing the theft of parked, unattended vehicles by disabling the ignition system of the vehicles being protected. In the same example, the vehicular system of the invention would also allow entry of a getaway foiling code after entering the thirteen digit fleet for all or individual fleet vehicles when the code for foiling a getaway is employed after entering the thirteen digits. Other modes are similarly accessed. The openly accessible modular programmable software 29 easily allows the programming of a variety of schemes for fleet managers. As a further description of the example using a thirteen digit scheme for group control in vehicle fleets, the additional four digits group code for fleet control can be programmed as the digits 1000, so that up to 999 fleet vehicles starting with the digit 1 are addressed as one group when the digits 1000 are entered after entry of the nine digit identification code. Thus the standard nine digit code implemented in software 29 can be employed for fleet control schemes or optional numerical schemes may be utilized by adjustments of the standard nine digit scheme. For example, the statement in software 29 pertaining to the number of required digits for the proprietary identification code can be changed to thirteen instead of nine. This change will require an entry of thirteen digits before a desired mode can be entered. The standard nine digit identification code and number of valid digits required for protecting fleet or individual vehicles control can already be designated as desired. The system, as is, already allows fleet or individual vehicles to be programmed during the initializing process.

Figure 3A:
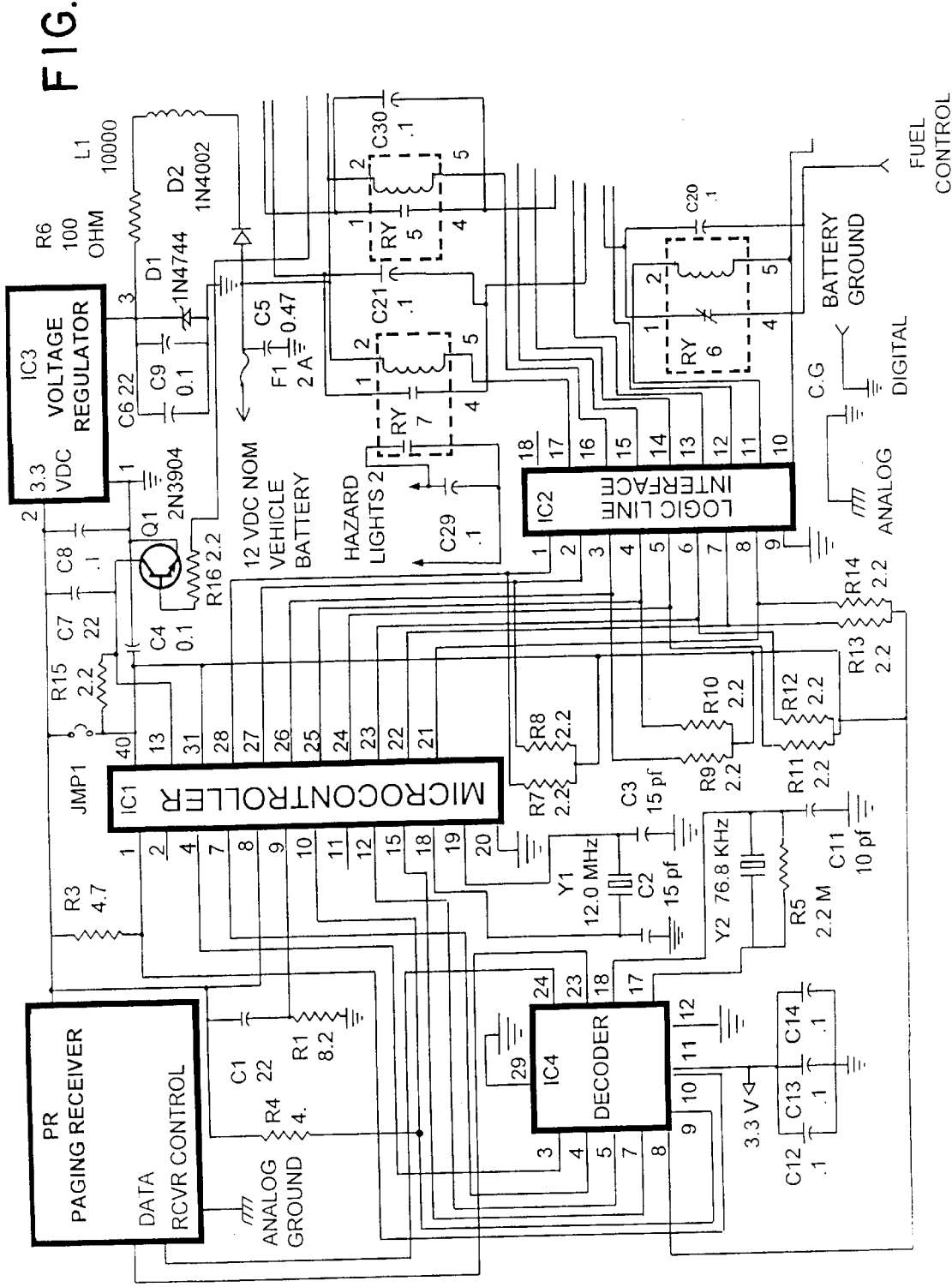
FIG. 3 is a description of the actual detailed, down to component level electrical schematic of the preferred embodiment of the system of the invention, disclosing details of all the ancillary components related to the system blocks and the total circuitry of the system of the invention.

FIG. 3 is a disclosure of the actual detailed, down to component level, electrical schematic of the preferred embodiment of the system of the invention, disclosing details of all the ancillary components related to the system blocks and the total circuitry of the preferred embodiment of the system of the invention. The theory of operation of the system, its subsystems and interaction of the subsystems are disclosed under the description of FIG. 2. The following additional description is intended to allow anyone skilled in the art, without any guessing or trial, to duplicate the preferred embodiment of the invention.

In FIG. 3, the paging receiver PR is built around a universal Philips UA 2080 paging receiver unit or an equivalent from Motorola and other sources. The choice of a universal Philips unit is intended to allow easy adaptation of the system of the invention in Europe and elsewhere in the world. The designation IC of an item in FIG. 3 indicates it being an integrated circuit chip. Decoder IC4 is a Philips PCD5003 decoder chip or equivalent from Motorola and other sources. The decoder chip IC4 can be obtained in combination with the paging receiver PR as one module. IC1 is a Philips 83CL51 microcontroller or equivalent from Intel and other sources. IC3 is a Linear Technologies LT1086-3.3 voltage regulator or its equivalent with a 3.3 Volt direct current (DC) output providing the system power for the paging receiver PR, decoder IC4 and microcontroller IC1. Logic interface IC2 is an Allegro ULN2803 chip or equivalent. It is connected to the 12 Volts DC nominal vehicle voltage of the vehicle and controls the operation of control relays RY1, RY2, RY3, RY4, RY5, RY6 and RY7. IC2 provides a logic line interface between microcontroller IC1 and the relays RY1, RY2, RY3, RY4, RY5, RY6 and RY7.

Other FIG. 3 elements include capacitors, resistors and inductor with ratings as shown. These components can be readily purchased from any electronics supply house, including the Radio Shack chain. C1 and R1 capacitor and resistor respectively provide a network for the reset timing pulse for microcontroller IC1 while resistor R4 is a pullup resistor for that circuit for compensating for variations in current. Capacitors C12, C13 and C14 provide bypassing for switching transients of IC1, IC4 and Paging receiver PR. R3 is a pullup resistor for the serial clock line and makes output adjustments for variations in current to the decoder integrated circuit IC4. Capacitors C6 and C9 are filters for the vehicle electrical power input line to voltage regulator IC3. Capacitors C7 and C8 are filters for the output side of voltage regulator IC3. C7 is for filtering the higher power, lower speed transients, while C8 is for filtering higher speed transients. CG is the common ground for the analog and digital grounds shown in FIG. 3 with different symbols for analog and digital grounds. C4 is a second bypass capacitor for IC1. Resistor R6, inductor L1 and zener diode D1 are for suppressing voltage transients on the electric power line from the vehicle. C5 is a line bypass capacitor for high power, high voltage transients on the electric power line of the vehicle. 12.0 Megahertz crystal Y1 and capacitors C2 and C3 interacting with microcontroller IC1 constitute an oscillator circuit providing a clocking signal for IC1. 76.8 Kilohertz crystal Y2, resistor R5 and capacitor C11 interacting with decoder IC4 constitute an oscillator circuit providing a clocking signal for decoder IC4. Resistors R7, R8, R9, R10, R11, R12, R13, and R14 are pullup resistors on the control lines from microcontroller IC1 to logic line interface IC2. Jumper JMP1 is a provision for testing. Capacitors C20, C28, C16, C15, C30, C21 and C29 are bypass capacitors for the contacts of relays RY6, RY4, RY2, RY1, RY3, RY5, and RY7 respectively. The number designations on the integrated circuits, such as on IC2, represent pin numbers on the chip. As an example, pin 17 on IC2 is connected to relay RY7, whereas pin 18 on the same integrated circuit is free and can be used for driving another relay if so desired.

As mentioned, one of the relays, RY5 in FIG. 3, is reserved for operating a vehicular loudhailer (megaphone) audio alarm, preferably one with a 'canned', prerecorded repeating verbal alarm such as, "This is a stolen vehicle. Call the police". The system of the invention is designed to control such a device, because it represents an additional means of helping locate a stolen vehicle. Such a loudhailer is a separate controlled vehicular subsystem and somewhat outside the scope of the invention. It can be purchased from a number of sources or custom constructed by a combination of a voice recording solid state chip with playback capability such as chip number ISD-VM1110A from Information Storage Devices of San Jose, California. The chip comes with full instructions on how to apply it and may be combined with any suitable megaphore, including the Radio Shack Catalog Number 32-2037 Powerhorn.

Although the functions of the other relays have been discussed under a description of FIG. 2, the specific functions of relays in FIG. 3 will be further discussed. The 51ND12-N 12 Volt relays are made by Fujitsu. Other 12 Volt equivalent vehicular relays may be used. Relay RY7 is used for controlling the hard lights. Relays RY5 and RY7 both activated with the start of the getaway theft foiling programmed sequence during which they maintain a steady closure of their contacts. When the hazard light control lines of the vehicle are powered by relay RY7, the built-in flasher of the vehicle produces flashing as in any emergency.

Relay RY6 controls the fuel supply to the engine by controlling the operation of the fuel pump or fuel injectors. In its de-energized state its contacts are closed and the electrical supply to the fuel controlling system of the vehicle is not interrupted. When relay RY6 is energized, its contacts interrupt the electrical supply line to the fuel pump or fuel injector bank per programmed software instructions of the microcontroller IC1 until the stolen vehicle is incapacitated and cannot be used for a getaway.

Relay RY4 controls the ignition line of the vehicle. In the de-energized state of relay RY4, the ignition of the vehicle is not interrupted because relay 18 has normally closed contacts. However, during a car theft getaway situation when the foiling mode of the Vindicator is activated, relay RY4 is instructed by microcontroller IC1, to open its contacts and interrupt the ignition when the fuel supply has reached its programmed minimum stage and turning on ignition is attempted after it is turned off. This will prevent the vehicle from starting once the ignition is turned off and engine incapacitation stage is reached for the engine. Engine incapacitation in the context of the invention is reached when the fuel supply has progressively been interrupted so that the vehicle cannot be used for a getaway. Transistor Q1, resistor R15 and resistor R16 form an ignition status reporting network. R15 is a collector loading resistor. Resistor R16 is a bias resistor on the base of transistor Q1. When Vindicator is in the getaway foiling mode and the fuel supply has progressed to the minimum programmed state, when ignition is turned off, the vehicle engine will not be allowed to restart. The ignition control system is also programmed so that ignition is finally interrupted when the vehicle has reached a minimum fuel supply point, representing minimum speed. To accomplish this, the ignition status reporting network is required, so that when ignition is turned on at the point of minimum fuel supply, then resistor R16 located at the base of transistor Q1 goes to a low state at point 13 on microcontroller IC1. This in turn results in microcontroller IC1 commanding logic line interface IC2 to energize relay RY4. This results in relay RY4 opening its contacts and interrupting ignition. After a period where the vehicle fuel supply has been at its minimum, microcontroller IC1 is programmed to disable the ignition system by maintaining a status of ordering relay RY4 to open and interrupt ignition any time it senses that an attempt is being made to turn ignition on. This state remains until the legitimate owner of the vehicle commands a reset activation mode by calling the pager number, entering a valid identification code and entering a code for the Vindicator to go to the reset mode. In a situation when the vehicle is unattended, the legitimate owner can access the vehicular system of the invention by calling a designated pager number, then entering the private user identification code, followed by dialing a specific code for invoking the unattended protection mode of the vehicle. In this case, relay RY4 gets energized per programmed software instructions of the microcontroller IC1 every time the ignition status sensor line reports an attempt to turn on ignition. When energized by such an attempt, relay RY4 interrupts the ignition line, preventing starting or driving of the car when it is unattended and the unattended protection mode is activated. This action also starts a cycle of activation of all other relays to draw attention to the vehicle and disable the fuel supply as described for FIG. 2.

Relay RY3 controls the electrical lines that activate the horns of the vehicle in which the system of the invention is installed. When relay RY3 is energized per instructions of the microcontroller IC1, its contacts bypass the normally open contacts that control the horn and cause the horn to sound. This allows the energizing of the horn in a specific programmed pattern during a theft and attempted getaway situation.

Relay RY1 and relay RY2 are used to control the high beam of the vehicle during the getaway foiling mode activation of the system of the invention. In its de-energized mode, relay RY1 and RY2 allow normal operation of the high beam of the vehicle. However, during the getaway foiling mode activation of the system of the invention, relay RY1 bypasses the normal high beam control system of the lights and the normally closed contacts of relay RY2 are opened and closed according to the pattern programmed. Such pattern is an SOS pattern command in the preferred embodiment of the invention.

With all the components and their functions identified for the full schematic of FIG. 3, a further detailed disclosure of the system of said schematic follows. As mentioned earlier, the paging receiver PR provides a demodulated binary baseband signal to the paging decoder IC4. Decoder IC4 decodes the baseband data received from the receiver, determines that it has the correct RIC (Receiver Identification Code), stores the data in its internal RAM (Random Access Memory), and notifies microcontroller IC1 that data is waiting by making the "Interrupt" output LOW. Receiver PR is turned off by the decoder while the controller is reading the received data. The data is passed to microcontroller IC1 over an industry standard Inter-Integrated Circuit (I2C) Bus (shown and identified in the flow chart in FIG. 2 between Decoder 3 and microcontroller 4). Decoder IC4 in FIG. 3 can be reset by microcontroller IC1 as required. Crystal Y2, R4, and C11 form an oscillator, operating at 76.8 KHz, to provide the decoder clock. Pin 8 of IC4 input allows decoder IC4 to interface to microcontroller IC1 during factory testing. To minimize power consumption, decoder IC4 periodically turns off receiver PR for short periods of time.

When microcontroller IC1 is ready to receive the data, it turns off decoder IC4 via the "Decoder On" input (IC4 pin 3), and reads the data from the internal RAM of decoder IC4. It then compares the data to the expected customer identification number, and code for the mode desired and, if correct, performs the requested mode. To provide long term storage of some data, microcontroller IC1 makes use of extra internal EEPROM in decoder IC4. This data is thus preserved in the event power to the Vindicator system is interrupted.

Microcontroller IC1 provides overall control of the Vindicator system. It decodes data received from the paging decoder IC4, determines the course of action via the embedded program and provides control via the output lines to the logic line interface relay drivers IC2. Microcontroller IC1 uses a standard 12.0 MHz crystal oscillator circuit Y1, C2, and C3 for a clock. Resistor R1 and capacitor C1 provide a power up reset for microcontroller IC1. A Phillips Semiconductor 83CL51 microcontroller used as IC1 provides 4 kilobytes (4Kb) of internal Electrically Programmable Read Only Memory (EPROM) for storage of the program and 128 bytes of internal Random Access Memory (RAM) for temporary storage of data and variables. The 83CL51 permits its internal processor to be stopped until action by the processor is required. Stopping the internal processor minimizes power consumption and electromagnetic noise.

Logic line to relay interface IC2 provides the interface between microcontroller IC1 and the relays. IC2 accepts a standard logic level signal from microcontroller IC1 and provides 12 Volt DC nominal vehicle power control to relays RY6, RY4, RY2, RY1, RY3, RY5, and RY7. IC2 also internally provides transient suppression for the relay coils to protect the output of the driver from switching transients.

A Linear Technologies LT1086 or equivalent voltage regulator is used as IC3. The voltage regulator IC3 reduces and regulates the supplied vehicular voltage. The supplied voltage from the vehicle is standard around 12 VDC (Volts Direct Current) +/−20%. This voltage is reduced by IC3 to 3.3 VDC +/−1%, which is the operating voltage of the receiving, decoding, and control circuitry. Diode D1 provides transient protection for the regulator. Capacitors C5, C6, C9, and inductor L1 filter the incoming vehicle power. Capacitors C7 and C8 act to filter out transients appearing at the output of voltage regulator IC3.

Paging decoder IC4 is a Phillips Semiconductor PCD5003 or equivalent. It decodes the received POCSAG encoded baseband paging signal, checks the RIC (Receiver Identification Code), notifies microcontroller IC1 of a valid received message, stores the received data, and provides Electrically Erasable and Programmable Read Only Memory (EEPROM). Decoder IC4 receives the POCSAG encoded data from the paging receiver PR, removes the synchronization bits, checks the paging system unit identification code, checks for and corrects any errors, stores the data in its RAM, and notifies microcontroller IC1 that the data is waiting to be read. Decoder IC4 notifies microcontroller IC1 when the last of the data has been read. The crystal circuit comprise of Y2, R5, and C11 provides the clock for decoder IC4.

Relays RY6, RY4, RY2, RY1, RY3, RY5, and RY7 provide interface devices to various vehicle subsystems being controlled by the Vindicator system of the invention.

Figure 4:
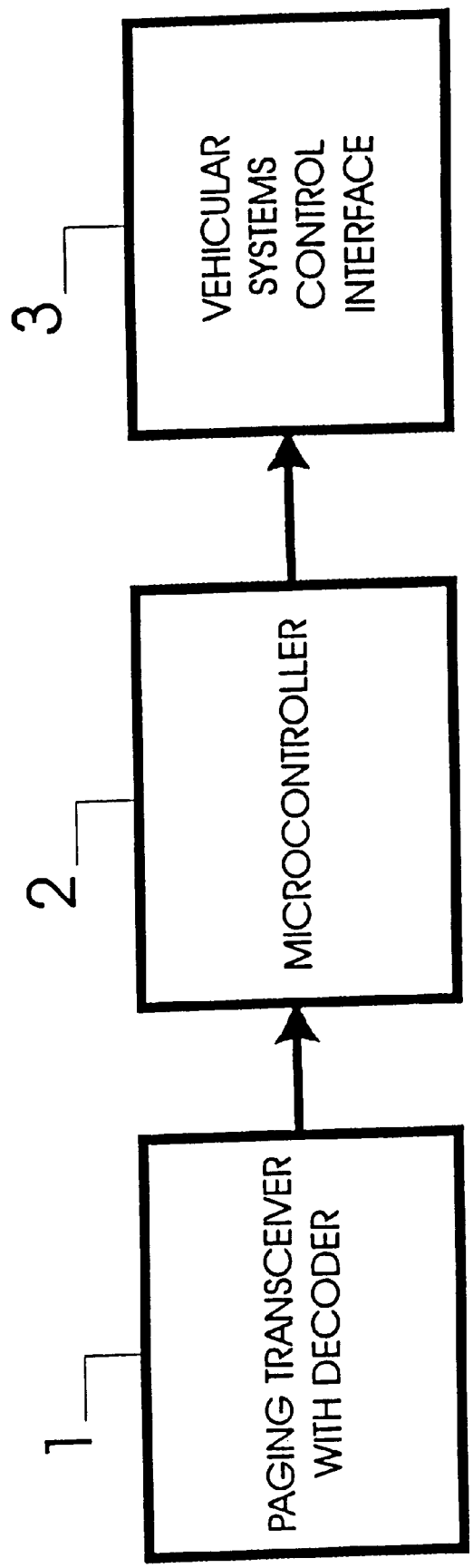
FIG. 4 is a block diagram of a second embodiment of the invention comprising a transceiver (transmitter/receiver) with its decoder unit 1, a microcontroller 2 and a vehicular interface 3.

FIG. 4 is a block diagram of a second embodiment of the invention operating over a two-way paging network, comprising a transceiver and decoder unit 1, a microcontroller 2 and a vehicular interface 3. The principal difference between this second embodiment and the preferred embodiment of the system of the invention is the substitution of a paging transceiver (transmitter/receiver) instead of a receiver as in the preferred embodiment of the invention. The transmitter portion of the transceiver in block 1 is under the control of microcontroller 2 and provides confirmation to the initiator of a theft foiling mode that the Vindicator has received and decoded a valid code entry. The transmitter portion of paging transceiver 1 can also be employed to transmit various types of data, such as GPS (global positioning system) information which would provide the exact location coordinates of the vehicle.

Figure 5A:
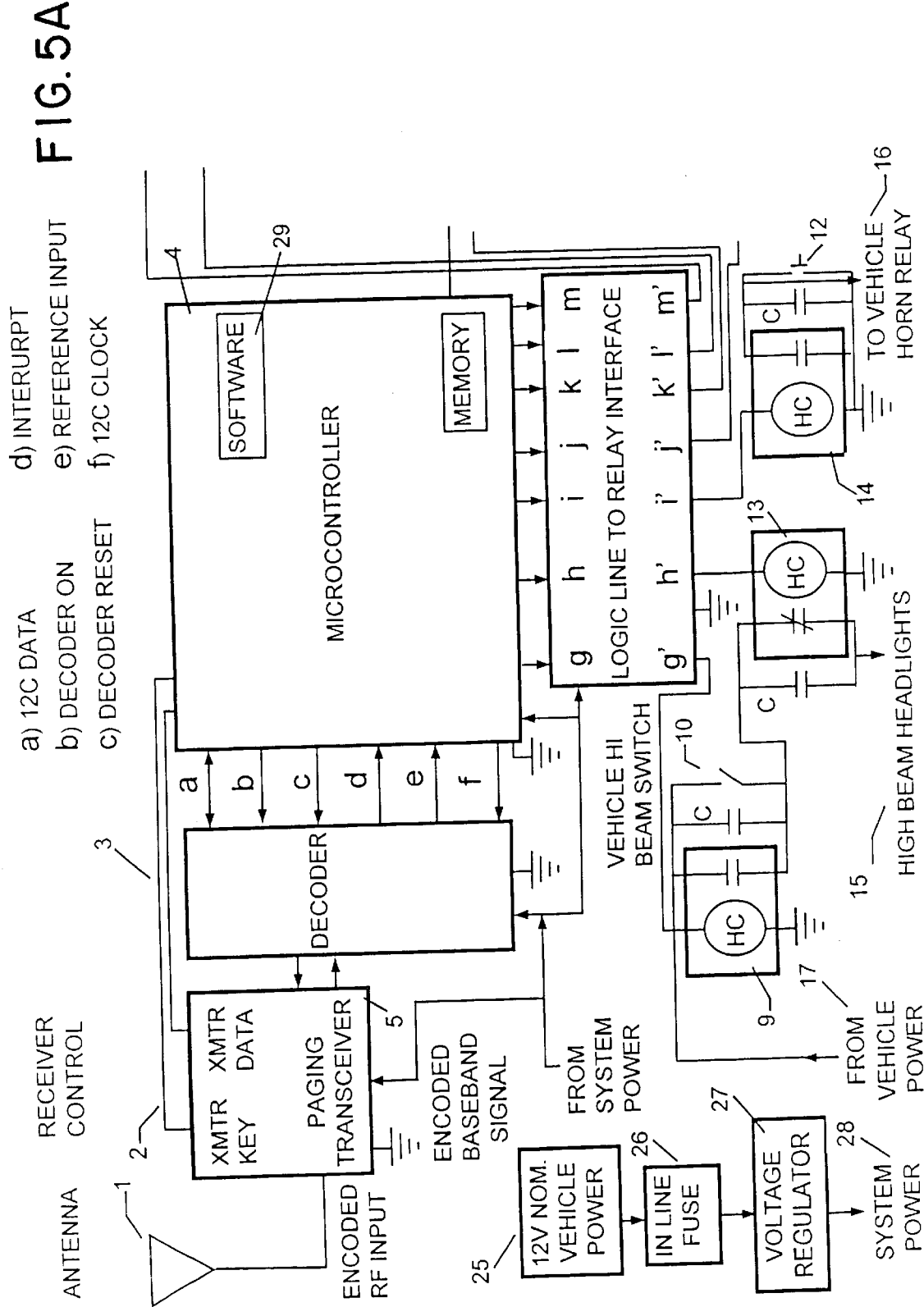
FIG. 5 is a detailed system connection and flow diagram of the embodiment of the invention represented by FIG. 4 in which a two-way paging transceiver module is substituted in lieu of a pager receiver module to provide transmitted acknowledgment by the system of the invention of the receipt of commands and to also transmit other desired data.
Figure 6A:
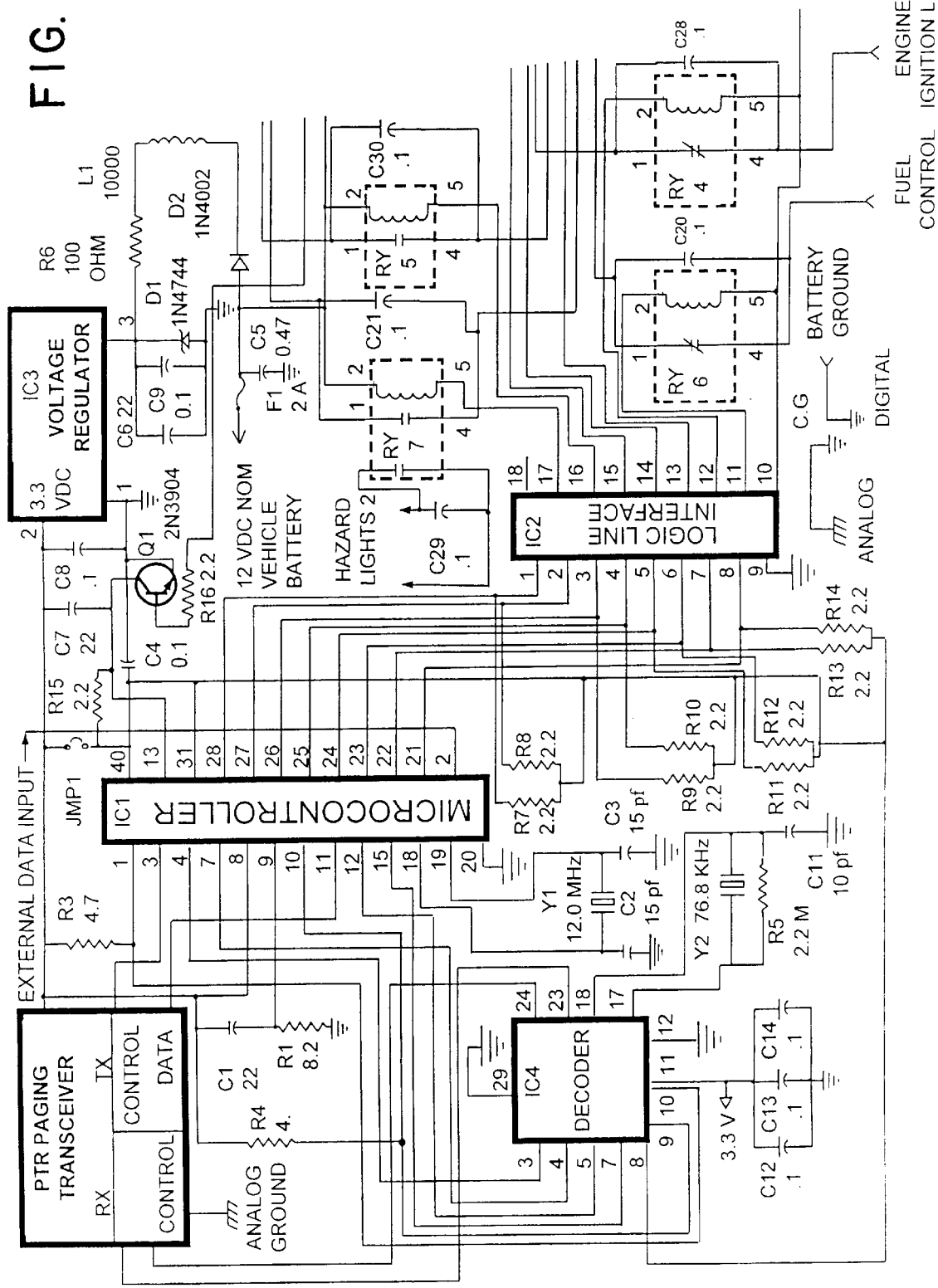
FIG. 6 is a description of the actual detailed, down to component level, electrical schematic of the second embodiment of the system of the invention, disclosing details of all the ancillary components related to the system blocks and the circuitry of the second embodiment system of the invention.
Figure 6B:
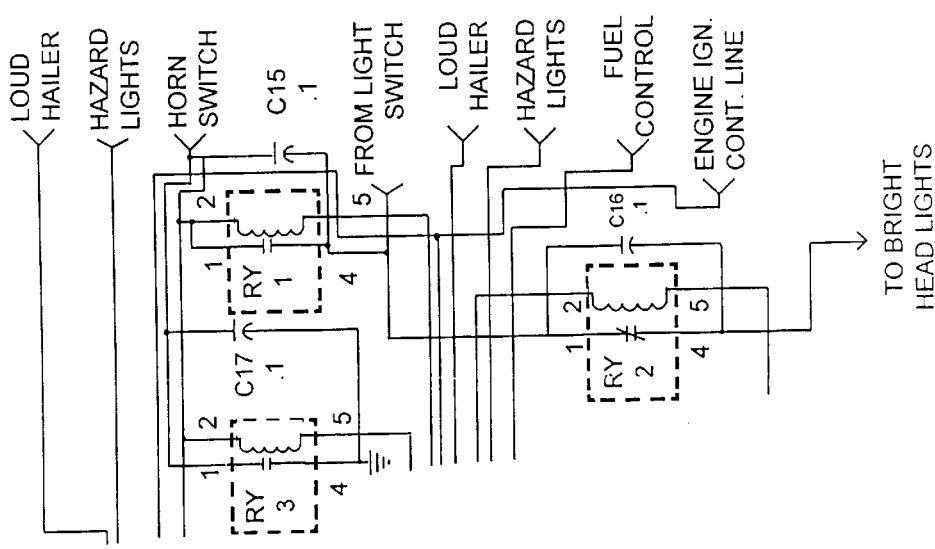

From an application standpoint, this second embodiment of the invention described in FIGS. 4, 5 and 6, aside from providing the transmission of an acknowledgment that a valid code is received and data transmission from external sources, is essentially identical to the preferred embodiment described in FIGS. 1, 2 and 3. Thus, the application of the second embodiment of the invention described in FIGS. 4, 5 and 6 is likewise the prevention of the theft of unattended fleet vehicles or individual vehicles, and to aid in the recovery of fleet vehicles or an individual stolen vehicle that is being driven away after a theft or carjacking. However, from a circuit and user standpoint, the preferred embodiment of the invention described in FIGS. 1, 2 and 3 employs a receiver alone approach. Said receiver alone approach is currently deemed the preferred embodiment because, the second embodiment of the invention employing two-way paging, is currently in its early stages, costs more, is limited with respect to sources of the transceiver unit and is still limited with respect to areas of coverage around the globe. However, the aforementioned limitations may change in the future and make the second embodiment of the invention more appealing.

Reverting to the block diagram of FIG. 4 for the second embodiment of the invention, after a vehicle is stolen, the legitimate owner, using the public telephone system, calls an assigned telephone number and enters the customer defined identification number plus a code to specify the operating mode desired. For the second embodiment of the invention, a Mode 6 (Code 6) would cause the transmitter portion of paging transceiver 1 to transmit other desired external data. In the case of a criminal escaping with a stolen vehicle, the Mode 1 (Code 1) used will enable the getaway foiling mode. The call made will result in a paging signal being sent over an existing paging network and received by the receiver portion of the paging transceiver and decoder in block 1, said decoder in block 1, being an integral portion of most commercial pager modules. The identification dialed by phone plus the code for the desired operating mode entered by phone is decoded by the decoder in block 1 and conveyed to the microcontroller 2 interconnected with the paging receiver and decoder in block 1. This will result in microcontroller 2 activating the transmitter portion of block 1 to transmit an acknowledgment that a valid identification code has been received. Microcontroller 2 will then also cause the vehicular interface 3 to activate a series of distinct alarms, followed by a gradual loss of the fuel flow to the engine of the vehicle, culminating in the fuel system being gradually and effectively disabled so as to prevent the escape of the criminal using the vehicle for a getaway, without posing a hazard to other motorists. Should the engine be shut off after the incapacitation of the engine whereby the vehicle is only capable of limited, low speed, the vehicle will not start due to the disablement of the ignition system as programmed into the system of the invention. Also, the software instructions cause the ignition to be turned off when a minimum fuel supply point is received. Pursuant to the main alarm and incapacitation event, the vehicle will continue to periodically sound the horn and flash the lights in, a distinctive pattern. This series of actions serves to foil the thief and to assist in the prompt recovery of the vehicle. The car may be returned to normal operating service by simply calling the assigned paging telephone number and entering the identification number of the legitimate owner of the vehicle plus the alarm reset code. Upon decoding an identification code corresponding to the identification code programmed during the installation initialization process of the system of the invention, the decoder portion of the paging transceiver sends back an acknowledgment to the transmitter portion of the transceiver in block 1. The transmitter portion of block 1 then transmits a preprogrammed acknowledgment over the two way paging network, confirming receipt of a valid signal by the vehicular system of the invention. Upon entry of an optionally configured Mode 6 (Code 6), external data transmission is enabled to employ the transmitter portion of paging transceiver 1 to transmit other data, including data about the vehicle and its location.

FIG. 5 is a detailed system connection and flow diagram of the preferred embodiment of the invention represented by block diagram FIG. 4, disclosing the connections and signal flow details of the system blocks, details of the interaction between the system elements and details of each sub-element of the vehicular interface system. Antenna 1 is an integral part of paging transceiver 2. Decoder 3 can be a portion of the paging transceiver 2, as in commercial paging transceivers, or an independent unit. In FIG. 5 Antenna 1, paging transceiver 2 and decoder 3 are shown separately to disclose the signal flow and interaction of the elements comprising the pager and decoder unit which are shown as a single block in FIG. 4. Such description in FIG. 5 is intended to enable one skilled in the art to utilize elements 1, 2 and 3 separately if so desired.

The paging receiver portion of paging transceiver 2 receives the FSK (Frequency Shift Keyed) signal from the antenna 1 and provides the encoded binary baseband signal 5 to the paging decoder 3. Signal formats other than FSK can be used and in such case transceiver 2 and decoder 3 are configured for such format. The encoded baseband signal 5 is the modulating signal. Decoder 3 receives the encoded baseband signal 5 from receiver 2, decodes it, checks and corrects errors, determines that the programmed Receiver Identification Code (RIC) is correct, stores the received data in the built-in Random Access Memory (RAM) buffer of the decoder 3, and communicates the data to the microcontroller 4 which invokes the activation of the transmitter portion of paging transceiver 2. The transmitter portion of paging transceiver 2 then transmits an acknowledgment over the two-way paging network employed to confirm the receipt of an acceptable signal to initiate the foiling mode desired.

The external data input port is connected to microcontroller 4 and utilized for optionally inputting data from external sources for transmission by the transmitter portion of paging transceiver 2. The external data is conveyed by microcontroller 4 to the transmitter portion of paging transceiver 2. For such optional data transmission microcontroller 4 also provides a control line to turn the transmitter portion of paging transceiver PTR on and off as required. External data can include information from other vehicular systems during emergencies or data from mobile terminals during normal use of the vehicle or GPS data related to the exact location of the vehicle during emergencies and for other requirements.

Decoder 3 minimizes power consumption by turning off the paging transceiver 2 periodically via the control line between Decoder 3 and paging transceiver PTR in the flow line portion of FIG. 5 and located between decoder 3 and transceiver 2. Decoder 3 also provides "real time" timing for the system as needed and a built-in Electrically Erasable Programmable Read Only Memory (EEPROM) for storage of critical data in the event of power loss. In this embodiment of the invention, the encoded baseband signal 5 conforms to the internationally recognized CCIR Radio Paging Code #1 commonly referred to as POCSAG (Post Office Code Standardization Advisory Group) encoding. Any other accepted standard could be substituted in the same configuration as FIG. 5 by simply substituting transceiver 2 and decoder 3 while maintaining the same scheme and other elements of FIG. 5.

The heart and uniqueness of the system, often described as the "personality" of the system of the invention, is defined by microcontroller 4 and its embedded programmable software instructions 29. The programmable software 29 used in the system of the invention, also referred to as source code and object code, imparts instructions to microcontroller 4 and governs the system of the invention according to the directives it contains. The programmable software 29 infrastructure used for the system of the invention is attached as further disclosure to allow anyone skilled in the art to recreate the system of the invention without undue effort and customize it as desired. The software: capabilities and features, as fully described for the preferred embodiment under FIG. 2, are identical for the second embodiment of the invention employing a transceiver PTR for all vehicle control functions.

Microcontroller 4 communicates with decoder 3 to acquire the decoded POCSAG data and compares it with what it is programmed to expect. If the data communicated to microcontroller 4 is correct per embedded software 29 instructions in the microcontroller 4, it executes the corresponding programmed action. Actions that require interaction with the vehicle subsystems are communicated to the logic line to relay interface unit 6 which performs the role of an interface for the vehicular system control devices shown as relays 7, 8, 9, 11, 13, 14 and 18 in FIG. 5. After weighing the pros and cons of using other types of control devices, in this preferred embodiment, heavy duty relays are employed for controlling the vehicular subsystems. Other solid state devices could be substituted in lieu of the electromechanical relays 7, 8, 9, 11, 13, 14 and 18 within the same scheme. All holding coils (energizing electromagnetic coils) for relays 7, 8, 9, 11, 13, 14 and 18 are labeled HC in FIG. 5. All contacts of the relays have a parallel bypass capacitor C to smooth the electrical make and break of the contacts and related current flow and interruption. The logic to relay interface 6 includes inherent means (diodes) of providing further smoothing of the make and break function of the contacts of relays 7, 8, 9, 11, 13, 14 and 18, minimizing related sparking that may cause pitting of the contacts over a period of time. Microcontroller 4 also controls the transmission of data from external sources by the transmitter portion of transceiver 2 through the control lines shown in FIG. 5 from microcontroller 4 to the transmitter data input port at point XMTR DATA of transceiver 2 and the control line from microcontroller 4 and transmitter keying control XMTR KEY of transceiver 2. Transceiver 4 can also allow direct data entry into its own serial data input port, in which case transmitter data can be directly input into the transmitter data port XMTR DATA.

Relay 7 is reserved for activating any ready made vehicular loudhailer unit (also known as a megaphone) with a built-in verbal announcement, providing warning to the public during the getaway foiling activation of the system of the invention, that the vehicle is stolen and police need to be notified. Relay 7 is a single pole single throw device (SPST) with normally open contacts. Relay 8 is a double pole single throw device (DPST) with normally open contacts, although it can also be a SPST relay if so desired. One set of the contacts of relay 8 as shown, controls the hazard lights of the vehicle in which the system of the invention is installed. In special cases, there may be two hazard light control lines or it may be desirable to program the software to provide a different pattern for each hazard line or use an extra set of contacts to turn on the interior lights or other vehicular device. In such cases, the second set of contacts of relay 8 can be used to control the second control line of the hazard lights or another vehicular device. Relays 7 and 8 are both activated with the start of the getaway theft foiling programmed sequence during which they maintain a steady closure of their contacts. In FIG. 5, the connections to the hazard lights are made through control lines 20 of relay 8 and connections to secondary hazard lights or to another vehicular device are made through control lines 21. Control lines 19 from relay 7 are used to operate a vehicular loudhailer or similar device as desired.

Relay 11 controls the fuel supply system to the engine through the control of the fuel pump or injector control line of the vehicle. In its de-energized state, its contacts are closed and the electrical supply to the fuel pump or fuel injectors of the vehicle is not interrupted. When energized, the contacts of relay 11 progressively interrupt the electrical supply line to the fuel pump or the injectors of the vehicle at points 22 and 22A per programmed software instructions of the microcontroller 4 until the stolen vehicle is incapacitated to very low speed and cannot be used for a getaway.

Relay 18 controls the ignition line of the vehicle. In its de-energized state, the ignition control line of the vehicle is not interrupted because relay 18 has normally closed contacts. However, during a car theft getaway situation when the getaway foiling mode of the Vindicator is activated and the engine is incapacitated by fuel starvation to its lowest programmed state, relay 18 is instructed by microcontroller 4, to open its contacts and interrupt the ignition line every time an attempt is made to turn ignition on. This prevents the vehicle from starting once the ignition is turned off. Also, at the point of minimum fuel supply, microcontroller 4 instructs the activation of relay 18 interrupting ignition and preventing turning it on. Ignition sensor status line 30 in conjunction with ignition status reporting network 31 provides the status of the ignition to microcontroller 4. When ignition is interrupted, relay 18, does not remain energized because that would leave a powered relay when the engine is stopped. Rather, ignition sensor status line 30 in conjunction with ignition status reporting network 31 sense any attempts to turn on the ignition and microcontroller 4 in such case energizes relay 18 which opens its contacts only as long as there is an attempt to turn the ignition on, preventing the ignition from being turned on. This status is maintained until a reset mode signal is sent by the legitimate owner of the vehicle and relay 18 then maintains its contacts closed and normal operation becomes possible. In a situation when the vehicle is unattended, the legitimate owner can access the vehicular system of the invention by calling a designated pager number, then enter a valid user identification code, followed by dialing a specific code for invoking the unattended protection mode of the vehicle. In this case relay 18 gets energized per programmed software 29 instructions of the microcontroller 4 and interrupts the ignition line every time an attempt is made to turn on ignition. This prevents starting or driving of the car when it is unattended and in the unattended protective mode. Ignition sensor status line 30 in conjunction with ignition status reporting network 31 provides the status of the ignition to microcontroller 4. Activation of this mode also starts a cycle of activation of all the other relays to disable the fuel supply and draw attention to the vehicle as already explained under a description of the available modes.

The system of the invention, through minor changes in its programmed software 29 instructions, can be made to react differently or with different timing sequences or invoke other modes of shut down if so required. However, from a safety standpoint, the preferred embodiment of the invention with standard software instructions 9 draws attention to the stolen vehicle and effects a gradual shut down of the fuel pump, followed by disabling the ignition at minimum fuel point, thus effectively preventing any use of the vehicle by the criminal for a getaway.

Relay 14 controls the electrical lines that activate the horns of the vehicle in which the system of the invention is installed. When relay 14 is energized per instructions of the microcontroller 4, its contacts bypass the normally open contacts that control the horn and make the horns to sound. This allows the energizing of the horn in a specific programmed pattern during a theft and attempted getaway situation. In the software 29 program disclosed for the preferred embodiment of the invention, an SOS (three short on/off commands followed by three longer on and off commands, followed by three on/off commands analogous to a "dit dit dit—dah dah dah—dit dit dit" morse signal) pattern for the horn is programmed and thus the horns produce an SOS pattern to draw public attention and discourage the criminal. SOS is a universally recognized sign of distress. Other patterns of horn activation can be easily implemented by modifying the software 29 program statements attached in the program portion pertaining to the horn.

Relay 9 and relay 13 are used to control the high beam of the vehicle during the getaway foiling mode activation of the system of the invention. In its de-energized mode, relay 9 and 13 allow normal operation of the high beam of the vehicle. However, during the getaway foiling mode activation of the system of the invention, relay 9 bypasses the normal high beam control system 10 of the lights and the normally closed contacts of relay 13 are opened and closed according to the pattern programmed. Such pattern is an SOS pattern command in the preferred embodiment of the invention.

When the microcontroller 4 is inactive, it is programmed to shut itself down to minimize power consumption and possible Radio Frequency Interference (RFI).

The 12 Volt nominal supply voltage 25 of the vehicle is connected to the vehicular system of the invention through power line wire 26 which includes an inline fuse and is connected to voltage regulator 27 and. Voltage regulator 27 provides the system power of 3.3 Volts for the vehicular system of the invention to paging receiver 2, decoder 3 and microcontroller 4. Logic line to relay interface 6 is connected to the 12 Volt DC nominal vehicle power and controls power to the holding coils of relays 7, 8, 9, 11, 13, 14 and 18.

FIG. 6 is the down to the component implementation of the second embodiment of the invention which is identical to that of the preferred embodiment of the system with the exception of a substitution of a transceiver and its control and input lines in lieu of the receiver alone in the preferred embodiment of the invention. Thus all of the components employed in FIG. 3 for the preferred embodiment, aside from the substitution of a transceiver in lieu of receiver PR, remain the same. Transceiver pagers, by their inherent nature, incorporate means of transmitting a confirmation from the transmitter portion of the transceiver pager (used in two-way paging) after receipt and decoding of a valid signal. Thus, the use of a transceiver in the front portion of the Vindicator does not affect the rest of the system which would be transparent to the use of a two-way paging unit in the front portion of the system. Thus, upon substituting a transceiver pager unit already equipped for sending a confirmation signal, essentially the same down to the component circuitry as for the preferred embodiment shown in FIG. 3 can be used by one skilled in the art to build the second embodiment of the invention. Accordingly, the description that follows will principally describe most of the elements already disclosed in FIG. 3 plus what particularly applies to the second embodiment that is different.

FIG. 6 is thus a disclosure of the actual detailed, down to component level, electrical schematic of the second embodiment of the system of the invention, disclosing details of all the ancillary components related to the system blocks and the total circuitry of the preferred embodiment of the system of the invention. The theory of operation of the system, its subsystems and interaction of the subsystems are disclosed under the description of FIG. 5. The software functions, modes and operating sequences are as described under FIG. 2. The following additional disclosure is intended to allow anyone skilled in the art, without guessing or trial, to construct the second the preferred embodiment of the invention.

In FIG. 6, paging transceiver PTR comprises a receiver portion and a transceiver portion. Initial two-way paging networks operate in the 1930 to 1990 MHz frequency range. However, any frequency range where spectrum allocation for two-way paging is available may be used. One type of two-way pager which incorporates a transceiver is Motorola's Tango two-way pager for which information is available from Motorola Paging Products Group. The designation IC of an item in FIG. 6 indicates it being an integrated circuit chip or a module comprising integrated circuits chips. Decoder IC4, as in some commercial two-way pagers, can be obtained in combination with the paging transceiver PTR as one module with internal printed circuit interconnections. It is shown here separately as a guidance to those skilled in the art who would prefer utilizing separate transceiver and decoder chips to construct the second embodiment of the invention. IC3 is a Linear Technologies LT1086 voltage regulator or its equivalent with a direct current (DC) output providing the system power requirements for the paging transceiver PTR, decoder IC4, microcontroller IC1, and logic line interface IC2. Logic interface IC2 is an Allegro ULN2803 chip or equivalent. It controls the 12 Volt DC nominal vehicle voltage to the holding coils of control relays RY1, RY2, RY3, RY4, RY5, RY6 and RY7. IC2 provides a logic line interface between microcontroller IC1 and the relays RY1, RY2, RY3, RY4, RY5, RY6 and RY7.

Other FIG. 6 elements include capacitors, resistors and inductor with ratings as shown. These components can be readily purchased from any electronics supply house, including the Radio Shack chain. C1 and R1 capacitor and resistor respectively provide a network for the reset timing pulse for microcontroller IC1 while resistor R4 is a pullup resistor for that circuit for compensating for variations in current. Capacitors C12, C13 and C14 provide bypassing for switching transients of microcontroller IC1, decoder IC4 and paging transceiver PTR. R3 is a pullup resistor for the serial clock line and makes output adjustments for variations in current to the decoder integrated circuit IC4. Capacitors C6 and C9 are filters for the vehicle electrical power input line to voltage regulator IC3. Capacitors C7 and C8 are filters for the output side of voltage regulator IC3. C7 is for filtering the higher power, lower speed transients, while C8 is for filtering higher speed transients. CG is the common ground for the analog and digital grounds shown in FIG. 6 with different symbols for analog and digital grounds. C4 is a second bypass capacitor for IC1.

Resistor R6, inductor L1 and zener diode D1 are for suppressing voltage transients on the electric power line from the vehicle. C5 is a line bypass capacitor for high power, high voltage transients on the electric power line of the vehicle. 12.0 Megahertz crystal Y1 and capacitors C2 and C3 interacting with microcontroller IC1 constitute an oscillator circuit providing a clocking signal for IC1. 76.8 Kilohertz crystal Y2, resistor R5 and capacitor C11 interacting with decoder IC4 constitute an oscillator circuit providing a clocking signal for decoder IC4. Resistors R7, R8, R9, R10, R11, R12, R13, and R14 are pullup resistors on the control lines from microcontroller IC1 to logic line interface IC2. Jumper JMP1 is a provision for testing. Capacitors C20, C28, C16, C15, C30, C21 and C29 are bypass capacitors for the contacts of relays RY6, RY4, RY2, RY1, RY3, RY5, and RY7 respectively. The number designations on the integrated circuits, such as on IC2, represent pin numbers on the chip. As an example, pin 17 on IC2 is connected to relay RY7, whereas pin 18 on the same integrated circuit is free and can be used for driving another relay if so desired.

One of the relays, RY5 in FIG. 6 is reserved for operating a vehicular loudhailer (megaphone) audio alarm, preferably one with a 'canned', prerecorded repeating verbal alarm such as, "This is a stolen vehicle. Call the police". The system of the invention is designed to control such a device, because it represents an additional means of helping locate a stolen vehicle. Such a loudhailer is a separate controlled vehicular subsystem and somewhat outside the scope of the invention. It can be purchased from a number of sources or custom constructed by a combination of a voice recording solid state chip with playback capability such as chip number ISD-VM1110A from Information Storage Devices of San Jose, California. The chip comes with full instructions on how to apply it and may be combined with any suitable megaphone including the Radio Shack Catalog Number 32-2037 Powerhorn.

Although the functions of the other relays have been discussed under a description of FIG. 5, the specific functions of relays in FIG. 6 will be further discussed. The 51ND12-N 12 Volt relays are made by Fujitsu. Other 12 Volt equivalent vehicular relays may be used. Relay RY7 is used for controlling the hazard lights. Relays RY5 and RY7 both activated with the start of the getaway theft foiling programmed sequence during which they maintain a steady closure of their contacts. When the hazard light control lines of the vehicle are powered by relay RY7, the built-in flasher of the vehicle produces flashing as in any emergency.

Relay RY6 controls the fuel supply to the engine by controlling the operation of the fuel pump or fuel injectors. In its de-energized state its contacts are closed and the electrical supply to the fuel controlling system of the vehicle is not interrupted. When relay RY6 is energized, its contacts interrupt the electrical supply line to the fuel pump or fuel injector bank per programmed software instructions to the microcontroller IC1 until the stolen vehicle is incapacitated and cannot be used for a getaway.

Relay RY4 controls the ignition of the vehicle. In the de-energized state of relay RY4, the ignition of the vehicle is not interrupted because relay 18 has normally closed contacts. However, during a car theft getaway situation when the getaway foiling mode of the Vindicator is activated, relay RY4 is instructed by microcontroller IC1, to open its contacts and interrupt the ignition when the fuel supply has reached its minimum programmed stage and turning on ignition is attempted after it is turned off. This will prevent the vehicle from starting once the ignition is turned off and engine incapacitation stage is reached. Engine incapacitation in the context of the invention is reached when the fuel supply has progressively been interrupted so that the vehicle is moving only at a slow speed and cannot be used for a getaway. Transistor Q1, resistor R15 and resistor R16 form an ignition status reporting network. R15 is a collector loading resistor. Resistor R16 is a bias resistor on the base of transistor Q1.

When Vindicator is in the getaway foiling mode and the fuel supply has progressed to the minimum programmed state, upon ignition being turned of the vehicle engine will not be allowed to restart. To accomplish this, the ignition status reporting network is required, so that when ignition is turned on at the point of minimum fuel supply, then resistor R16 located at the base of transistor Q1 goes to a low state at point 13 on microcontroller IC1. This in turn results in microcontroller IC1 commanding logic line interface IC2 to energize relay RY4. This results in relay RY4 opening its contacts and interrupting ignition. After a period where the vehicle fuel supply has been at its minimum, microcontroller IC1 is programmed to disable the ignition system and maintaining a status of ordering relay RY4 to open and interrupt ignition any time it senses that an attempt is being made to turn ignition on. This state remains until the legitimate owner of the vehicle commands a reset activation mode by calling the pager number, entering a valid identification code and entering a code for the Vindicator to go to a reset mode.

In a situation when the vehicle is unattended, the legitimate owner can access the vehicular system of the invention by calling a designated pager number, then entering the private user identification code, followed by dialing a specific code for invoking the unattended protection mode of the vehicle. In this case relay RY4 gets energized per programmed software instructions of the microcontroller IC1 every time the ignition status sensor line reports an attempt to turn on ignition. When energized by such an attempt, relay RY4 interrupts the ignition line, preventing starting or driving of the car when it is unattended and the unattended protection mode is activated. Also upon an attempt being made to turn on ignition in the unattended protection mode, all other relays are activated to disable the fuel supply and draw attention to the vehicle, as already explained in a description of the available modes.

Relay RY3 controls the electrical lines that activate the horns of the vehicle in which the system of the invention is installed. When relay RY3 is energized per instructions of the microcontroller IC1, its contacts bypass the normally open contacts that control the horn and cause the horns to sound. This allows the energizing of the horn in a specific programmed pattern during a theft and attempted getaway situation.

Relay RY1 and relay RY2 are used to control the high beam of the vehicle during the getaway foiling mode activation of the system of the invention. In its de-energized mode, relay RY1 and RY2 allow normal operation of the high beam of the vehicle. However, during the getaway foiling mode activation of the system of the invention, relay RY1 bypasses the normal high beam control system of the lights and the normally closed contacts of relay RY2 are opened and closed according to the pattern programmed. Such pattern is an SOS pattern command in the preferred embodiment of the invention.

With all the components and their functions identified for the full schematic of FIG. 6, a further detailed disclosure of the system of said schematic follows. The paging receiver portion of paging transceiver PTR provides a demodulated binary baseband signal to the paging decoder IC4. Decoder IC4 decodes the baseband data received from the receiver, determines that it has the correct RIC (Receiver Identification Code), stores the data in its internal RAM (Random Access Memory), and notifies microcontroller IC1 that data is waiting by making the "Interrupt" output LOW. Transceiver PTR is turned off by decoder IC4 while the controller is reading the received data. The data is passed to microcontroller IC1 over an industry standard Inter-Integrated Circuit (12C) Bus (shown and identified in the flow chart in FIG. 5 between Decoder 3 and microcontroller 4). Decoder IC4 in FIG. 6 can be reset by microcontroller IC1 as required. Crystal Y2, resistor R4, and capacitor C11 interact with decoder IC4 to form an oscillator, operating at 76.8 KHz, to provide the decoder clock. Pin 8 of IC4 input allows decoder IC4 to interface to microcontroller IC1. To minimize power consumption, decoder IC4 periodically turns off transceiver PTR for short periods of time.

When microcontroller IC1 is ready to receive the data, it turns off decoder IC4 via the "Decoder On" input (IC4 pin 3), and reads the data from the internal RAM of decoder IC4. It then compares the data to the expected customer identification number, and code for the mode desired and, if correct, performs the requested mode. To provide long term storage of some data, microcontroller IC1 makes use of extra internal EEPROM in decoder IC4. This data is thus preserved in the event power to the Vindicator system is interrupted.

Microcontroller IC1 provides overall control of the system including the transmitter portion of the second embodiment of the invention. IC1 decodes data received from the paging decoder IC4, determines the course of action via the embedded program instructions and provides control via the output lines to the logic line interface relay driver IC2. In the case of receipt of a Mode 6 (Code 6), microcontroller IC1 controls the activation of the transmitter portion of paging transceiver PTR and the sending of data from external sources. To accomplish this, one line from pin 39 on microcontroller IC1 in FIG. 6 controls the transmitter on-off (control) in the transmitter portion of transceiver PTR. Another line in FIG. 6, between pin 11 of microcontroller IC1 and the transmitter portion of transceiver PTR one sends data received from the external data input port connected to pin 2 of microcontroller IC1 in FIG. 6. This arrangement allows this embodiment of the invention to optionally transmit desired custom external data from the external data input port of transceiver PTR per custom software instructions, such as transmission of vehicle systems data or GPS data pertaining to the position coordinates of the vehicle.

12.0 MHz crystal Y1, capacitor C2, and capacitor C3 form part of the oscillator circuit providing clocking for Microcontroller IC1. Resistor R1 and capacitor Cl provide a power up reset for microcontroller IC1. A Phillips Semiconductor 83CL51 microcontroller used as IC1 provides 4 kilobytes (4Kb) of internal Electrically Programmable Read Only Memory (EPROM) for storage of the program and 128 bytes of internal Random Access Memory (RAM) for temporary storage of data and variables. The 83CL51 permits its internal processor to be stopped until action by the processor is required. Stopping the internal processor minimizes power consumption and electromagnetic noise.

Logic line to relay interface IC2 provides the interface between microcontroller IC1 and the relays. IC2 accepts a standard logic level signal from microcontroller IC1 and provides 12 Volt DC nominal vehicle power to control the activation of relays RY6, RY4, RY2, RY1, RY3, RY5, and RY7. IC2 also internally provides transient suppression for the relays to protect them from switching transients.

A Linear Technologies LT1086 or equivalent voltage regulator is used as IC3 to provide system power. The voltage regulator IC3 reduces and regulates the supplied 12 VDC (Volts Direct Current) +/−20% voltage from the vehicle. IC3 provides the regulated operating voltage required by the receiving, transmitting, decoding, and control circuitry. Diode D1 provides transient protection for the regulator. Capacitors C5, C6, C9, and inductor L1 filter the incoming vehicle power. Capacitors C7 and C8 act to filter out transients appearing at the output of voltage regulator IC3.

Paging decoder IC4 is a Phillips Semiconductor PCD5003 or equivalent. It decodes the received POCSAG encoded baseband paging signal, checks the RIC (Receiver Identification Code), notifies microcontroller IC1 of a valid received message, stores the received data, and provides Electrically Erasable and Programmable Read Only Memory (EEPROM). Decoder IC4 receives the POCSAG encoded data from the paging transceiver PTR, removes the synchronization bits, checks the paging system unit identification code, checks for and corrects any errors, stores the data in its RAM, and notifies microcontroller IC1 that the data is waiting to be read. Decoder IC4 notifies microcontroller IC1 when the last of the data has been read. Microcontroller IC1 then commands the transmitter portion of paging transceiver PTR to transmit an acknowledgment via the two-way paging network that a valid decoded command has bees received by the Vindicator. The crystal circuit comprised of 76.8 KHz crystal Y2, resistor R5 and capacitor C11 interacting with decoder IC4 form an oscillator circuit and provide clocking for decoder IC4.

The embodiments of the invention and their customized versions can operate over paging networks in the Very High Frequency Band or the Ultra High Frequency Band or Super High Frequency Bands, as well as over the new paging and messaging networks designated as Narrowband Personal Communications Services (Narrowband PCS), Metropolitan Trading Area (MTA) networks and Basic Trading Area (BTA) networks, using respective receivers, transceivers and matching decoders within the architecture of the embodiments of the system of the invention. In the future, paging may be carried out over other frequency bands and other mediums such as portions of the radio and TV bands in various schemes, as well as with satellite systems. In such cases, the system of the invention can be implemented as described with the substitution of pager receivers, transceivers and decoders conforming to the new mediums and their signaling, leaving the system building blocks of FIGS. 1 and 4 and the interaction and hardware interfacing with the pager portion essentially the same.

While particular embodiments of the invention have been described, the architecture, the infrastructure and the open, accessible and modular programmable software of the invention is versatile and can be customized by those skilled in the art to produce a variety of actions, timings sequences, expansions, reductions, adaptations to fleet requirements, specific requirements, hardware substitutions, logical hardware changes and hardware combinations within the scope infrastructure and architecture of the system of the invention. All such modifications, variations and other applications are deemed within the spirit and scope of the invention.

We claim as our invention:

1. A vehicular communication and control system for providing communication, security and theft getaway foiling capabilities for individual vehicles and fleets, said system operating over radio paging and messaging networks accessible to the general public and government, and employing the addressing and messaging routines, paging data signals and coverage range of said radio networks, said system comprising:

(a) a communication portion of said communication and control system including a radio frequency unit with a receiver for receiving paging data signals over said radio paging networks and a decoder with auxiliary memory for decoding said paging data signals received by said receiver, said receiver receiving the data signals including a pager address and message employing said addressing and messaging routines, and said message containing a personal identification portion and an action mode portion, said decoder decoding and verifying said pager address and affecting storage of said message containing personal identification and action mode portions of said message in said auxiliary memory;

(b) a program and data processing portion including a microcontroller with non-volatile memory and programmable software including programmed personal identification information and preprogrammed action modes, each action mode corresponding to a plurality of coordinated and interactive preprogrammed instructions, including a plurality of instructions for communicating, security and theft getaway foiling, said microcontroller having means for interacting with said communication portion, with said programmable software, and with said non-volatile memory, to provide processing and verification of said personal identification and action mode message portions and if said personal identification message portion is identical to said programmed personal identification information and if said action mode is identical to a preprogrammed action mode to then provide said plurality of corresponding preprogrammed instructions to said vehicular communication and control system, including instructions for communication, security and theft getaway foiling; and (c) a control portion of said vehicular communication and control system including a multi-controller assembly for controlling multiple vehicular systems, said multi-controller assembly directly interacting with said multiple vehicular systems independently of the vehicle serial bus, body computer and multiplexers, and said control portion interacting with said program and data processing portion to enable security and theft getaway foiling per said preprogrammed instructions.

2. The system of claim 1, wherein said multi-controller assembly includes a relay bank.

3. The system of claim 1, wherein said multi-controller assembly includes a solid-state control device bank.

4. The system of claim 1, wherein said paging data signals are in POCSAG format.

5. The system of claim 1, wherein said communication, security and theft getaway foiling instructions include instructions for coordinated activation of a vehicular loudhailer preprogrammed with stored messages.

6. The system of claim 1, wherein said plurality of coordinated and interactive preprogrammed instructions include communication, security and theft getaway foiling instructions for sensing and control of the vehicle ignition system status interactively coordinated with said plurality of communication, security and theft foiling instructions.

7. The system of claim 1, wherein said plurality of coordinated and interactive preprogrammed instructions include communication, security and theft getaway foiling instructions for the programmed control of the vehicle engine fuel supply coordinated interactively with said plurality of communication, security and theft getaway foiling instructions.

8. The system of claim 1, wherein said preprogrammed instructions include instructions for causing coordinated and interactive communication, security and theft getaway foiling actions, including flashing of the vehicle lights in a programmed pattern, intermittent patterned sounding of the vehicle horn, activation of a vehicular loudhailer with stored announcement, sensing and control of the vehicle engine ignition system and progressive diminishing of the engine fuel supply according to preprogrammed software instructions.

9. The system of claim 1, wherein said preprogrammed instructions include instructions for causing coordinated and interactive combinations of SOS pattern flashing of the vehicle lights, SOS intermittent sounding of the vehicle horn, activation of a vehicular loudhailer with stored announcement, sensing and control of the vehicle engine ignition system interactive, coordinated, and progressive disabling of the vehicle engine fuel supply according to preprogrammed software instructions.

10. The system of claim 1, wherein said message of said paging data signals includes reset mode signals, factory test mode signals and initialization mode signals for said vehicular communication and control system.

11. The apparatus of claim 1 wherein said vehicular communication and control system operates over a super high frequency band paging and messaging network.

12. The apparatus of claim 1 wherein said vehicular communication and control system operates over a narrowband personal communication services network.

13. A vehicular communication and control system for providing communication, security and theft getaway foiling capabilities for individual vehicles and fleets, said system operating over two-way radio paging and messaging networks accessible to the general public and government, and employing the addressing and messaging routines, paging data signals, messaging and coverage range of said radio networks, said system comprising:

(a) a communication portion of said vehicular communication and control system including a radio frequency unit with a paging and messaging transceiver having a receiver, transmitter and a decoder with auxiliary memory, said receiver for receiving paging and messaging data signals and said transmitter for transmitting paging and messaging data signals over the radio paging and messaging networks; said paging and messaging transceiver interacting with addressing and messaging routines to receive and transmit said data signals including messaging said data signals upon reception including address data and message data, said data containing a personal identification portion and an action mode portion, said decoder decoding and verifying said address data and affecting storage of said data signals containing said personal identification and action mode portions in said auxiliary memory, and upon transmission transmitting messages and data;

(b) a program and data processing portion including a microcontroller with non-volatile memory and programmable software including programmed personal identification information and a plurality of preprogrammed action modes, each action mode corresponding to a plurality of coordinated and interactive preprogrammed instructions, including a plurality of instructions for communicating, security and theft getaway foiling, said microcontroller having means for acquiring data from additional data sources, processing said data from additional data sources according to preprogrammed software instructions and interacting with said communication portion to control and communicate said data from additional data sources, with said microcontroller further interacting with said programmable software, and with said non-volatile memory, to provide processing and verification of received personal identification and action mode message portions and if said personal identification message portion is identical to said programmed personal identification information and if said action mode is identical to a preprogrammed action mode to then provide said plurality of corresponding preprogrammed instructions to said vehicular communication and control system, including instructions for communicating, security and theft getaway foiling; and (c) a control portion of said vehicular communication and control system including a multicontroller assembly for controlling multiple vehicular systems, said multicontroller assembly directly interacting with multiple vehicular systems independently of the vehicles serial bus, computer and multiplex systems, and said control portion interacting with said program and data processing portion to enable security and theft getaway foiling in accordance with said preprogrammed instructions.

14. The system of claim 13 wherein said multi-controller assembly includes a relay bank.

15. The system of claim 13 wherein said multi-controller assembly includes a solid-state control device bank.

16. The system of claim 13, wherein said communicating of said data from additional data sources includes communicating of data related to vehicle position coordinates.

17. The system of claim 13, wherein said communicating of said data from additional data sources includes communicating data signals from a global positioning system data source.

18. The system of claim 13, wherein said paging and messaging data signals include reset mode signals, factory test mode signals and initialization mode signals for said vehicular communication and control system.

19. The system of claim 13, wherein said preprogrammed software instructions include instructions for causing coordinated and interactive combinations of preprogrammed SOS pattern flashing of the vehicle lights, preprogrammed SOS intermittent sounding pattern of the vehicle horn, the activation of a vehicular loudhailer with stored announcement, the sensing and control of the vehicle engine ignition system and interactive and coordinated, progressive disabling of the vehicle engine fuel supply according to preprogrammed software instructions.

20. The apparatus of claim 13 wherein said data from said additional data sources is data from a mobile terminal.

21. The apparatus of claim 13 wherein said vehicular communication and control system operates over a super high frequency band paging and messaging network.

22. The apparatus of claim 13 wherein said radio paging and messaging networks is a narrow band personal communication services network.

23. A vehicular communication and control system comprising:

(a) a communication portion for communication of a signal containing data and a message having an identification portion and an action portion over a paging and messaging network accessible to the general public;

(b) a decoder for decoding said signal containing said data and message received over said paging and messaging network;

(c) a vehicle interface for selectively controlling various vehicular functions on a sequenced basis such that the overall disablement of the vehicle in motion occurs on a progressive basis;

(d) a processor for processing said signal containing said data and message and providing instructions to operate the vehicular communication and control system: and (e) programmable instructions to operate said vehicular communication and control system.

24. The apparatus of claim 23 wherein said vehicle interface includes a solid state control device bank.

25. The apparatus of claim 23 wherein said communication portion is a receiver.

26. The apparatus of claim 23 wherein said communication portion is a paging and messaging receiver.

27. The apparatus of claim 26 wherein said processor interacts with said communication portion and said vehicle interface.

28. The apparatus of claim 27 wherein said programmable instructions is programmable software instructions.

29. The apparatus of claim 27 wherein said communication portion and said decoder receive and decode the addressing and messaging routines and paging data signals of said paging and messaging network.

30. The apparatus of claim 27 wherein said processor is connected to said decoder internally.

31. The apparatus of claim 27 wherein said processor includes an (EEPROM) electrically erasable programmable read-only memory unit.

32. The apparatus of claim 27 wherein said processor includes a (RAM) random access memory unit.

33. The apparatus of claim 28 wherein said programmable software instructions include instructions to said vehicle interface for theft getaway foiling.

34. The apparatus of claim 23 wherein said communication portion is a transceiver.

35. The apparatus of claim 34 wherein said processor interacts with said communication portion and said vehicle interface.

36. The apparatus of claim 35 wherein said programmable instructions is programmable software instructions.

37. The apparatus of claim 35 wherein said communication portion employs the addressing and messaging routines and data signals of a two-way paging and messaging network.

38. The apparatus of claim 35 wherein said transceiver is a paging and messaging transceiver.

39. The apparatus of claim 35 wherein said processor and said communication portion have external data input means.

40. The apparatus of claim 39 wherein said external data input means is used to input GPS data on the position of the vehicle for processing by said processor and communicating by said communication portion.

41. The apparatus of claim 39 wherein said external data input means has means for data input from a mobile terminal.

42. The apparatus of claim 23 wherein said vehicular communication and control system operates over a super high frequency band paging and messaging network.

43. The apparatus of claim 23 wherein said communication portion operates over a narrowband personal communication services network.

44. The system of claim 1, wherein said personal identification portion of said message identifies a group of vehicles through the use of an initial portion of the personal identification message containing characters that are common to that group of vehicles, and a special string of repetitive characters that designate that a group communication is in process for said group, wherein said group communication is responded to by all the vehicles in said group.

45. The system of claim 44, wherein said personal identification portion further comprises a non-common personalized string of special characters for a specific vehicle in said group.

46. The system of claim 1, wherein the coverage range of said radio networks is one of a wide area paging and messaging network or a nationwide coverage paging network.

47. The system of claim 1, wherein said messaging routines of said paging and messaging networks includes:

an address and a message dialed from a public telephone, wherein the message comprises a string of characters having a first portion that represents a personal identification and a second portion that represents an action mode; and wherein said paging data signals of the receiver are decoded and verified by said decoder and said personal identification and action mode message containing the personal identification and action mode data are stored by said decoder in said auxiliary memory for communication to the program and data processing portion of said vehicular communication and control system.

48. The system of claim 1, further comprising a transfer element for transferring security and theft foiling instructions from said programmable software to said control portion of said vehicular system.

49. The system of claim 1, further comprising means for confirming the proper programming of a personal ID received from a telephone.

50. The system of claim 13, wherein said personal identification portion of said data signals identifies a group of vehicles through the use of an initial portion of the personal identification message containing characters that are common to that group of vehicles, and a special string of repetitive characters that designate that a group communication is in process for said group, wherein said group communication is responded to by all the vehicles in said group.

51. The system of claim 13 wherein the coverage range of said paging and messaging networks is a wide area coverage in the case of a wide area paging and messaging network and nationwide coverage in the case of a nationwide coverage paging and messaging network, said coverage range determining the range over which said communication, security and theft getaway is communicated with said vehicular communication and control system.

52. The system of claim 13, wherein the coverage range of said paging and messaging networks is a wide area coverage in the case of a wide area paging a messaging network or nationwide coverage in the case of a nationwide coverage paging and messaging network.

53. The system of claim 13, wherein said messaging routines of said paging and messaging networks includes:

an address and a message entered from a public telephone, wherein the message comprises a string of characters having a first portion that represents a personal identification and a second portion that represents an action mode; and wherein said address data signals of the receiver are decoded and verified by said decoder and said message data signals including the personal identification and action mode data signals are stored by said decoder in said auxiliary memory for communication to the program and data processing portion of said vehicular communication and control system.

54. The system of claim 13, further comprising a transfer element for transferring security and theft foiling instructions from said programmable software to said control portion of said vehicular system.

55. The system of claim 13, further comprising means for receiving ancillary data from ancillary data producing systems in the vehicle, and storing and processing said ancillary data as said data from additional sources and interacting with said communication portion, program and data processing portion and control portion.

56. The system of claim 13, further comprising means for confirming the proper programming of a personal ID received from a telephone.

57. The system of claim 51, wherein said preprogrammed software instructions include instructions for causing coordinated and interactive communication, security and theft getaway foiling actions, including flashing of the vehicle lights in a preprogrammed pattern, intermittent sounding of the vehicle horn in a preprogrammed pattern, the activation of a vehicular loudhailer with stored announcement, sensing and control of the vehicle engine ignition system and progressive diminishing of the engine fuel supply according to preprogrammed software instructions.

* * * * *